(12) United States Patent
Yi

(10) Patent No.: US 12,538,357 B2
(45) Date of Patent: Jan. 27, 2026

(54) SYSTEMS AND TECHNIQUES FOR SIDELINK COMMUNICATION

(71) Applicant: Cable Television Laboratories, Inc., Louisville, CO (US)

(72) Inventor: Yunjung Yi, Vienna, VA (US)

(73) Assignee: Cable Television Laboratories, Inc., Louisville, CO (US)

( * ) Notice: Subject to any disclaimer, the term of this patent is extended or adjusted under 35 U.S.C. 154(b) by 460 days.

(21) Appl. No.: 18/094,119

(22) Filed: Jan. 6, 2023

(65) Prior Publication Data

US 2023/0217493 A1 Jul. 6, 2023

Related U.S. Application Data

(60) Provisional application No. 63/333,415, filed on Apr. 21, 2022, provisional application No. 63/297,131, filed on Jan. 6, 2022, provisional application No. 63/297,533, filed on Jan. 7, 2022.

(51) Int. Cl.
| | |
|---|---|
| *H04W 74/08* | (2024.01) |
| *H04W 74/00* | (2009.01) |
| *H04W 74/0816* | (2024.01) |
| *H04W 92/18* | (2009.01) |

(52) U.S. Cl.
CPC ..... *H04W 74/0816* (2013.01); *H04W 74/006* (2013.01); *H04W 74/0866* (2013.01); *H04W 92/18* (2013.01)

(58) Field of Classification Search
CPC .......... H04W 74/0816; H04W 74/006; H04W 74/0866; H04W 92/18
See application file for complete search history.

(56) References Cited

U.S. PATENT DOCUMENTS

| | | | |
|---|---|---|---|
| 2020/0305127 A1* | 9/2020 | Huang | H04W 72/02 |
| 2022/0295560 A1* | 9/2022 | Shokri Razaghi | H04W 72/23 |
| 2022/0312481 A1* | 9/2022 | Talarico | H04L 1/187 |
| 2023/0064680 A1* | 3/2023 | Huang | H04W 74/0816 |
| 2023/0109449 A1* | 4/2023 | Liu | H04W 74/0808 370/329 |
| 2024/0372670 A1* | 11/2024 | Guo | H04L 5/0033 |
| 2024/0389142 A1* | 11/2024 | Guo | H04W 74/0808 |

* cited by examiner

*Primary Examiner* — Derrick V Rose
(74) *Attorney, Agent, or Firm* — Polsinelli PC

(57) ABSTRACT

Certain aspects of the present disclosure provide techniques for sidelink communication. One example method generally comprises identifying, by a wireless device, a frequency of a sidelink operation being unlicensed spectrum. The wireless device may detect whether a synchronization signal is on one or more carriers overlapping with the frequency, and in response to the detection, determine whether to enable the sidelink operation in the frequency. The wireless device may send an indication of whether the sidelink operation is enabled based on the determination.

21 Claims, 21 Drawing Sheets

```
SL-Assistance-Info::=              SEQUENCE {
    a list of SL-Frequency;
    a list of SL-Assistance-inFrequency;
}
SL-Assistance-inFrequency ::= SEQUENCE {
    center frequency;
    a list of SL-BWP;
    channel busy ratio DOUBLE {0, ... , 1};
    a number of devices INT{1, .... N};
    SL-mode ENUMERATED {mode 1, mode 2};
    a list of SL-Priority;
}
SL-BWP ::= SEQUENCE {
    point A;
    subcarrier spacing;
    starting PRB;
    bandwidth;
}
SL-Priority ::= INT {0, ..., 7}
```

FIG. 2

```
SIB12-IEs-r16 ::=              SEQUENCE {
    sl-ConfigCommonNR-r16      SL-ConfigCommonNR-r16,
    lateNonCriticalExtension   OCTET STRING                OPTIONAL,
    ...
}

SL-ConfigCommonNR-r16 ::=      SEQUENCE {
    sl-FreqInfoList-r16                    SEQUENCE (SIZE (1..maxNrofFreqSL-r16)) OF SL-FreqConfigCommon-r16
OPTIONAL,    -- Need R
    sl-access-barring                      SEQUENCE (SIZE (1..maxNrofFreqSL-r16)) OF Boolean;

sl-UE-SelectedConfig-r16               SL-UE-SelectedConfig-r16
OPTIONAL,    -- Need R
    sl-NR-AnchorCarrierFreqList-r16        SL-NR-AnchorCarrierFreqList-r16
OPTIONAL,    -- Need R
    sl-EUTRA-AnchorCarrierFreqList-r16     SL-EUTRA-AnchorCarrierFreqList-r16
OPTIONAL,    -- Need R
    sl-RadioBearerConfigList-r16           SEQUENCE (SIZE (1..maxNrofSLRB-r16)) OF SL-RadioBearerConfig-r16
OPTIONAL,    -- Need R
    sl-RLC-BearerConfigList-r16            SEQUENCE (SIZE (1..maxSL-LCID-r16)) OF SL-RLC-BearerConfig-r16
OPTIONAL,    -- Need R
    sl-MeasConfigCommon-r16                SL-MeasConfigCommon-r16
OPTIONAL,    -- Need R
    sl-CSI-Acquisition-r16                 ENUMERATED {enabled}
OPTIONAL,    -- Need R
    sl-OffsetDFN-r16                       INTEGER (1..1000)
OPTIONAL,    -- Need R
    t400-r16                               ENUMERATED {ms100, ms200, ms300, ms400, ms600, ms1000, ms1500,
ms2000} OPTIONAL,    -- Need R
    sl-MaxNumConsecutiveDTX-r16            ENUMERATED {n1, n2, n3, n4, n6, n8, n16, n32}
OPTIONAL,    -- Need R
    sl-SSB-PriorityNR-r16                  INTEGER (1..8)
OPTIONAL,    -- Need R
}

SL-NR-AnchorCarrierFreqList-r16 ::=   SEQUENCE (SIZE (1..maxFreqSL-NR-r16)) OF ARFCN-ValueNR SL-EUTRA-AnchorCarrierFreqList-r16 ::=   SEQUENCE (SIZE (1..maxFreqSL-EUTRA-r16)) OF ARFCN-ValueEUTRA
```

| Bit field mapped to index | Channel Access Type | The CP extension T_"ext" index |
|---|---|---|
| 0 | Type2C-ULChannelAccess | 2 |
| 1 | Type2A-ULChannelAccess | 3 |
| 2 | Type2A-ULChannelAccess | 1 |
| 3 | Type1-ULChannelAccess | 0 |

| Bit field mapped to index | Channel Access Type | The CP extension T_"ext" index | Initiator of the channel occupancy associated with the UL transmission |
|---|---|---|---|
| 0 | No sensing | 0 | gNB |
| 1 | No sensing | 2 | gNB |
| 2 | Sensing within a 25us interval | 0 | gNB |
| 3 | Sensing | 0 | UE |

Note: Row index 3 may only be applicable if *ue-SemiStaticChannelAccessConfig* is provided. Otherwise, the row is reserved.

FIG. 16B

SYSTEMS AND TECHNIQUES FOR SIDELINK COMMUNICATION

CROSS-REFERENCE TO RELATED APPLICATION

This application claims priority to U.S. Provisional Patent Application No. 63/297,131, filed Jan. 6, 2022, U.S. Provisional Patent Application No. 63/297,533, filed Jan. 7, 2022, and U.S. Provisional Patent Application No. 63/333,415, filed Apr. 21, 2022, the entirety of which are incorporated herein by reference.

BACKGROUND

Sidelink is a technology that enables direct communication between two devices without the direct participation of a base station in the transmission and reception of data traffic. Sidelink delivers a broad set of benefits and may operate in different spectrum configurations such as dedicated, in-band licensed, and unlicensed, providing the flexibility for it to be adopted in various different scenarios or environments. Sidelink provides benefits for various use cases including automotive communication and other use cases, such as wearable devices communications, gaming, internet of things (IoT), mobile broadband, and public safety.

It is with these observations in mind, among others, that the presently disclosed technology was conceived.

BRIEF SUMMARY

The aforementioned problems may be addressed using the systems, methods, and devices disclosed herein.

In some aspects, the present disclosure relates to a method for wireless communication, including: identifying, by a wireless device, a frequency of a sidelink operation being unlicensed spectrum; detecting whether a synchronization signal is on one or more carriers overlapping with the frequency; in response to the detection, determining whether to enable the sidelink operation in the frequency; and sending an indication of whether the sidelink operation is enabled based on the determination.

In some aspects, the present disclosure relates to a method for wireless communication, including: receiving, by a wireless device, one or more messages indicating one or more frequency configurations, where each of the one or more frequency configurations includes a sidelink bandwidth part, and condition information, the condition information indicating whether one or more conditions are to be applied to enable a sidelink operation via the sidelink bandwidth part; and determining whether to perform the sidelink operation via the sidelink bandwidth part based on the condition information.

In some aspects, the present disclosure relates to a method for wireless communication, including: transmitting, by a wireless device, a first sidelink transmission of a first transport block in a first slot; determining a listen before talk category for a second sidelink transmission based on at least one of: a duration between a latest symbol of the first sidelink transmission and an earliest symbol of the second sidelink transmission; whether the first transport block is the same as the second transport block; or whether a sidelink feedback resource is allocated in the first slot; and transmitting, by the wireless device, the second sidelink transmission of a second transport block in a second slot based on the determination.

In some aspects, the present disclosure relates to a method for wireless communication, including: receiving, by a wireless device, a first sidelink transmission of a first transport block in a first slot; determining a listen before talk category for a second sidelink transmission of a second transport block based on at least one of: a duration between a latest symbol of the first sidelink transmission and an earliest symbol of a second sidelink transmission; whether the first transport block is the same as the second transport block including the second sidelink transmission; or whether a sidelink feedback resource is allocated in the first slot; and transmitting, by the wireless device, the second sidelink transmission of the second transport block in a second slot based on the determination.

In some aspects, the present disclosure relates to a method for wireless communication, including: determining, by a wireless device, a first sidelink transmission in a first slot and a second sidelink transmission in a second slot; determining whether to transmit a signal via a last symbol of the first slot in response to the first slot and the second slot being contiguous in time domain; and transmitting the signal via the last symbol in response to the determination.

In some aspects, the present disclosure relates to a method for wireless communication, including: determining, by a wireless device, a first sidelink transmission in a first slot and a second sidelink transmission in a second slot; determining whether the first slot and the second slot are contiguous in time domain; and receiving a signal via a last symbol of the first slot in response to determining that the first slot and the second slot are contiguous.

In some aspects, the present disclosure relates to a method for wireless communication, including: receiving, by a wireless device, one or more configuration parameters for a sidelink operation, wherein the one or more configuration parameters indicate a sidelink bandwidth part indicating frequency domain resources and one or more channel occupancy durations of a cell; receiving: a slot format indicator (SFI) of the cell, wherein the slot format indicator indicates a first channel occupancy duration of the one or more channel occupancy durations; and a downlink control information (DCI) indicating sidelink resources, of the sidelink bandwidth part, for a sidelink transmission; determining a channel access type of the sidelink transmission via the sidelink resources, based on the first channel occupancy duration and the DCI; and transmitting the sidelink transmission to a second wireless device.

In some aspects, the present disclosure relates to a method for wireless communication, including: receiving, by a wireless device, one or more configuration parameters for a sidelink operation in an unlicensed spectrum, wherein the one or more configuration parameters indicate: a sidelink bandwidth part (BWP) in the unlicensed spectrum; a slot format indicator (SFI) of a serving cell, wherein the serving cell overlaps in frequency domain with the sidelink bandwidth part; and a channel access type in downlink control information (DCI); receiving the DCI scheduling sidelink resources, for sidelink traffic, based on a DCI format of the DCI; in response to a presence of the channel access in the DCI, determining the channel access type of the sidelink traffic, based on a channel occupancy determined based on the SFI of the serving cell and a channel access type indicated by the DCI; and transmitting the sidelink traffic based on the channel access type.

In some aspects, the present disclosure relates to a method for wireless communication, including: receiving, by a wireless device, one or more configuration parameters indicating a sidelink bandwidth part (BWP) in an unlicensed spectrum;

receiving downlink control information (DCI), from a base station, indicating a channel occupancy time (COT) duration for a carrier overlapping with the unlicensed spectrum; determining whether to transmit or drop a sidelink transmission at least based on at least a portion of a sidelink resource for the sidelink transmission overlapping with the COT; and transmitting the sidelink transmission via the sidelink BWP in response to determining to transmit.

The foregoing summary is intended to be illustrative and is not meant in a limiting sense. Many features of the embodiments may be employed with or without reference to other features of any of the embodiments. Additional aspects, advantages, and/or utilities of the presently disclosed technology will be set forth in part in the description that follows and, in part, will be apparent from the description, or may be learned by practice of the presently disclosed technology.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the disclosed subject matter. It should be understood, however, that the disclosed subject matter is not limited to the precise embodiments and features shown. The accompanying drawings, which are incorporated in and constitute a part of this specification, illustrate an implementation of systems, methods, and devices consistent with the disclosed subject matter and, together with the description, serves to explain advantages and principles consistent with the disclosed subject matter.

FIG. 2 shows an example of user equipment (UE) assistance information, in accordance with certain aspects of the present disclosure.

FIG. 3 illustrates an example of a barring configuration for sidelink configuration, in accordance with certain aspects of the present disclosure.

FIGS. 16A and 16B are tables showing channel access type and cyclic prefix (CP) extension for downlink control information (DCI), in accordance with certain aspects of the present disclosure.

DETAILED DESCRIPTION

Figure 1:
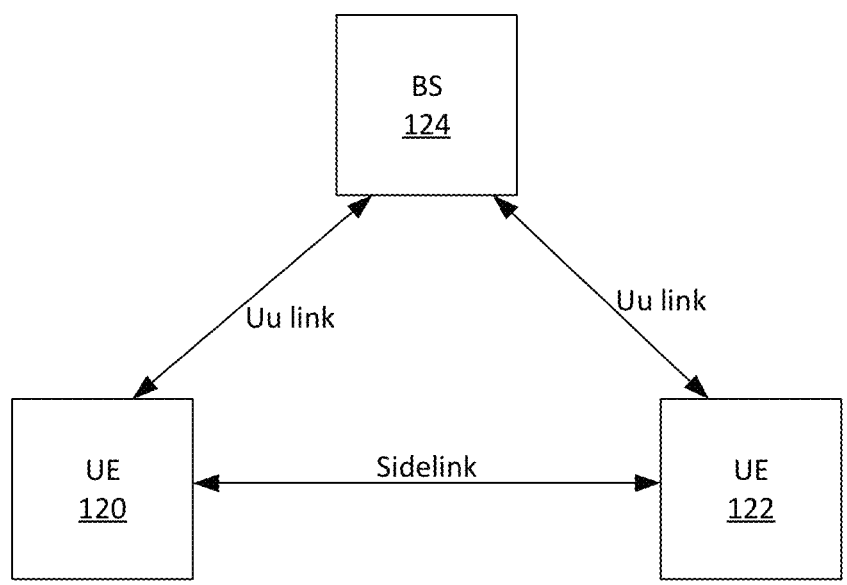
FIG. 1 illustrates a sidelink between devices and an interface for communication between each device and a base station, in accordance with certain aspects of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

I. Terminology

The phraseology and terminology employed herein are for the purpose of description and should not be regarded as limiting. For example, the use of a singular term, such as, "a" is not intended as limiting of the number of items. Further, it should be understood that any one of the features of the presently disclosed technology may be used separately or in combination with other features. Other systems, methods, features, and advantages of the presently disclosed technology will be, or become, apparent to one with skill in the art upon examination of the figures and the detailed description. It is intended that all such additional systems, methods, features, and advantages be included within this description, be within the scope of the presently disclosed technology, and be protected by the accompanying claims.

Further, as the presently disclosed technology is susceptible to embodiments of many different forms, it is intended that the present disclosure be considered as an example of the principles of the presently disclosed technology and not intended to limit the presently disclosed technology to the specific embodiments shown and described. Any one of the features of the presently disclosed technology may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the presently disclosed technology may include a variety of combinations and/or integrations of the embodiments described herein. Additionally, all aspects of the present disclosure, as described herein, are not essential for its practice. Likewise, other systems, methods, features, and advantages of the presently disclosed technology will be, or become, apparent to one with skill in the art upon examination of the figures and the description. It is intended that all such additional systems, methods, features, and advantages be included within this description, be within the scope of the presently disclosed technology, and be encompassed by the claims.

Any term of degree such as, but not limited to, "substantially," as used in the description and the appended claims, should be understood to include an exact, or a similar, but not exact configuration. The terms "comprising," "including" and "having" are used interchangeably in this disclosure. The terms "comprising," "including" and "having" mean to include, but not necessarily be limited to the things so described.

Lastly, the terms "or" and "and/or," as used herein, are to be interpreted as inclusive or meaning any one or any combination. Therefore, "A, B, or C" or "A, B, and/or C" mean any of the following: "A," "B," or "C"; "A and B"; "A and C"; "B and C"; "A, B and C." An exception to this definition will occur only when a combination of elements, functions, steps or acts are in some way inherently mutually exclusive.

FIG. 1 illustrates a sidelink between devices and Uu interface for communication between each device and a base station. In some examples, the communication between the devices (e.g., UEs 120, 122) and base station (BS) 124 is referred to as the access link. The access link may be provided via a Uu interface. Communication between the devices may be referred as the sidelink.

In some examples, two or more devices (e.g., UEs 120, 122) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as acknowledgement and/or negative acknowledgement. For example, CSI related to a sidelink channel quality may be carried over PSFCH or PSSCH. According to certain aspects, different operation modes, for example with different types of duplexing, may be used for sidelink and/or access link communications between one or more access links and/or one or more sidelinks. As will be discussed in more detail below, a sidelink device may communicate using time division duplexing (TDD) operating modes, time division multiplexing (TDM) operating modes, full-duplex operating modes, half-duplex operating modes, spatial division multiplexing (SDM) operating modes, frequency division multiplexing (FDM) operating modes, full band full duplexing modes, and/or subband full duplexing modes.

Sidelink operation (e.g., (direct) device-to-device communication, peer-to-peer communication, ad-hoc communication) may be used for vehicle to other device communication (e.g., to vehicle, Infra structure, person) via intelligent transport system (ITS) spectrum, or among devices via licensed spectrum. Sidelink operation may also be applied among devices and/or vehicles via unlicensed spectrum and/or shared spectrum. Unlicensed spectrum may be defined as spectrum where Wi-Fi and/or NR-Unlicensed operation may coexist. Unlicensed spectrum may comprise 2.4 GHz, 5 GHz unlicensed spectrum, 6 GHz unlicensed spectrum and/or the like. Shared spectrum may comprise Citizens Broadband Radio Service (CBRS) spectrum, 3.1 GHZ, and/or the like. For example, 6 GHz may comprise 5.825 GHz to 6.175 GHz spectrum. The unlicensed spectrum may also comprise about 900 MHZ, 27 GHZ, or 60 GHz. The dedicated spectrum may also comprise ITS spectrum, 3GPP band 47 (5855 MHz-5925 Mhz), and/or the like. The licensed spectrum may also comprise band 3 (1710 MHZ-1785 MHz), 5, 7, 34, 71 (633 MHz-698 MHZ) and/or the like.

Sidelink operation may be performed among devices in different scenarios. For example, a first device may be connected to a mobile network while a second device may not be connected to a mobile network. As another example, a first device may be connected to a first mobile network and a second device may be connected to the first mobile network or a second mobile network. As another example, a first device may not be connected to a first mobile network and a second device may not be connected to the first mobile network or a second mobile network.

The sidelink operation may be performed based on (pre-) configured information. For example, the configuration may be done via a base station for a first device when the first device is connected to the base station. The configuration may be pre-given/configured in a factory for a second device when the second device is not connected to a base station. For example, the (pre-) configured information may comprise a list of frequency or a priority of frequency list where a wireless device or a device may perform a sidelink operation. As used herein, a device may refer a wireless device, a vehicle, a robot, a wall-connected device, a device mounted on a vehicle, a device implanted on a human, or a device attached/associated with a smart phone/human.

When a sidelink operation is performed via an unlicensed spectrum, it is possible that some other radio access technology may share the spectrum. For example, the sidelink and Wi-Fi operation may coexist in 5 GHz unlicensed spectrum. For example, the sidelink and new radio (NR) unlicensed may coexist in 6 GHz unlicensed spectrum.

When sidelink operation coexist with another operation (e.g., wireless LAN operation, NR-U operation), sidelink operation may interfere with other operation. For example, when a human uses a game controller via sidelink operation while another human uses Wi-Fi at home via the same frequency, interference between sidelink and Wi-Fi becomes significant. This may degrade performance/quality of the sidelink operation as well as the Wi-Fi operation. For example, Wi-Fi access point (AP) may change frequency when it detects a beacon from another AP or detects high channel busy ratio. Thus, when sidelink and WLAN operations coexist, WLAN may switch a channel that may interfere with other WLAN operation and/or NR-U operation. While WLAN and/or NR-U operations are possible via unlicensed spectrum only, sidelink operation may be possible via unlicensed and/or licensed spectrum.

In existing technologies, sidelink operation may determine a frequency/spectrum to operate based on a priority list and/or (pre-) configured information. The sidelink operation may not consider other operations sharing the same frequency/spectrum.

In some aspects of the present disclosure, a device may inform a network (e.g., a base station, a gateway network function) of one or more sidelink operations. In the example, the device may transmit assistance information to the network. For example, the device may inform a base station that the device is performing a sidelink operation in an unlicensed spectrum. The device may indicate information (e.g., the assistance information) comprising one or more of the followings: (1) frequency where sidelink operation occurs, (2) a list of priority levels/priorities of the sidelink operation (e.g., sidelink priority values), (3) (minimum or maximum or current) channel occupancy time of the sidelink operation, (4) a number of devices of the sidelink operation (e.g., estimation of recipients or members in a group), or (5) a location of the device. The network may use the information to determine whether to switch a channel/frequency and/or a number of wireless devices supported in the frequency and/or a list of traffic/applications supported in the frequency. This may improve the quality of the network operation when sidelink and network operation coexist in the same frequency/channel. In an example, the device may inform the assistance information in response to receiving a request from the network. For example, the network may request the assistance information when the device is associated with the network.

In certain aspects of the present disclosure, a device may not be allowed to operate a sidelink operation in a frequency/channel/spectrum in response to detecting one or more synchronization signals and/or one or more beacon signals and/or any signals indicating the network operation (e.g., Uu signals, WLAN signals) from one or more base stations and/or one or more access points. This may prioritize mobile network operation via NR-U or WLAN over sidelink operation. The device may take the next frequency in a priority list of frequencies to avoid coexistence between sidelink and network operation. This may protect network operation by disallowing sidelink operation potentially impacting the network operation.

For example, a device may be (pre-) configured with a priority list of frequency information, or one or more frequency information where each frequency in the priority list of frequency information or each frequency of the one or more frequency information may be (pre-) configured with one or more threshold values. The device may determine to utilize a frequency, of the priority list of frequency information or the one or more frequency information, based on the priority list, based on the priority, and/or one or more threshold values of the frequency. For example, when the priority list indicates a first frequency (f1), a second frequency (f2) to fn, where f1 is associated with a first threshold (th1), and f2 is associated with a second threshold (th2), and so on, the device may use f1 for the sidelink operation when a condition based on th1 is satisfied. For example, the th1 may be a busy ratio. The condition may be satisfied when the busy ratio on f1 is equal to or less than th1. The one or more threshold values may correspond to one or more metrics. The one or more metrics may comprise one or more of: a busy ratio, a channel occupancy time, a presence of NR-U, a presence of Wi-Fi, a presence of base station, a presence of AP, a location, a zone (e.g., an area of [x1, y1] to [x2, y2]) where sidelink operation may be allowed in the frequency and/or the like. This may enable efficient coexistence between sidelink and network operation. In an example, each of the one or more frequency information may comprise a frequency, a priority and one or more thresholds. The priority may be used to indicate an order of the one or more frequency information.

In an example aspect, a device may be allowed to transmit a discovery signal based on a priority where the priority may be determined based on one or more of a connection to a base station, or a connection to an AP. The device may broadcast a discovery signal in a frequency where the base station or the AP does not use the frequency. The device may indicate one or more frequencies or a list of frequencies for a sidelink operation. The device may determine the one or more frequencies or the list of frequencies based on measurements/signal detection from a network of the base station or the AP. For example, the one or more frequencies or the list of frequencies may not comprise one or more second frequencies that are intended or used by the base station or the AP. One or more devices, hearing the discovery signal and/or the one or more frequencies or the list of the frequencies, may update their priority list or a list of frequencies for a sidelink operation.

In some aspects, one or more conditions to transmit a discovery signal may be determined. For example, in a certain zone/region/geographical area and/or a frequency, a device may transmit a discovery signal in response to the device not detecting any synchronization signals/beacons from a network node such as a base station or an access point. For example, in a certain zone/location and/or frequency, a device may transmit a discovery signal when it is connected to a base station and/or an AP, and may not transmit the discovery signal otherwise. For example, a device may transmit a discovery signal when the device is connected to a base station and/or an AP in unlicensed spectrum that is not ITS spectrum or when the device is operating in a licensed spectrum/frequency.

In some aspects, a device may detect one or more signals/synchronization signals from a base station or one or more beacons/signals from an access point. The device may be connected via the base station or the AP and may maintain a connection while the device is operating a sidelink. The device may be allowed to operate sidelink transmission at least when the device is connected to the base station or the access point. The device may operate based on mode 1 sidelink operation (e.g., a base station transmits scheduling/resource information for the sidelink transmission) when the device detects a synchronization signal from a base station. The device may be allowed to operate a sidelink in unlicensed spectrum, while the device is connected to a base station or an access point (AP) in the unlicensed spectrum, in response to the device being configured with the mode 1 sidelink operation. Otherwise (e.g., the device is configured with mode 2 sidelink operation), the device may not operate sidelink in the unlicensed spectrum in response to the device being connected to the base station or the AP in the unlicensed spectrum.

In some aspects, a device operating a sidelink operation may support NR-U operation or WLAN operation. The device may determine/detect/sense channel and receive channel occupancy time (COT) indication from either a base station or an AP. The device may not be allowed to transmit sidelink channel(s)/signal(s) during the COT from the base station or the AP. The device may be allowed to transmit channel(s)/signals toward the base station or the AP (e.g., Uu or WLAN operation may be allowed during COT while sidelink transmission is being halted during the COT). In an example, the device may transmit sidelink channel(s) during the COT if the base station schedules sidelink resources during the COT. The network operation may comprise WLAN operation and/or Uu operation via NR-U. In an example, the device operating the sidelink in the unlicensed spectrum may not operate Uu or WLAN in the unlicensed spectrum. In an example, a device may operate either sidelink or Uu/WLAN in an unlicensed spectrum.

Some aspects are directed toward providing UE assistance information. For example, a wireless device may be connected to a base station or an AP. The base station or the AP may operate via unlicensed spectrum. In some cases, the wireless device may not be connected/associated with/to the base station or the AP. The wireless device may operate sidelink via an unlicensed spectrum. When the wireless device is connected to the base station or the AP, the base station or the AP may configure the wireless device to report one or more assistant information. The configuration may be given via system information block(s) or via UE-specific radio resource control message(s). The wireless device may transmit assistant information via radio resource control (RRC) messages and/or broadcast messages to the base station or the AP. The wireless device may transmit assistance information to another wireless device via sidelink RRC message(s).

Assistance information may comprise one or more of the following. The assistance information may comprise one or more frequencies where sidelink discovery signals are detected, sidelink operation is being performed, or sidelink traffic is sensed. The one or more frequencies may comprise unlicensed spectrum only, or unlicensed/dedicated (e.g., ITS)/shared spectrum (e.g., CBRS) only or any type of spectrum. The one or more frequencies may further comprise one or more sidelink bandwidth parts (BWP) operating in a frequency. A frequency of the one or more frequencies may comprise one or more first sidelink BWPs. For each frequency of the one or more frequencies, a point A (reference starting physical resource block (PRB) index) may also be indicated.

For each frequency of the one or more frequencies, channel busy ratio (CBR) of a sidelink BWP may be reported for the frequency. One or more CBRs may be reported when one or more frequency/sidelink BWPs are operated. A first CBR and a first frequency may be reported, where the first CBR is determined in the first frequency. For each frequency of the one or more frequencies, sidelink operation mode (e.g., mode 1 vs mode 2) of a frequency may be reported. Mode 1 may indicate that the base station is to schedule resources for a sidelink operation on the frequency. Mode 2 may indicate that the wireless device (UE) is to determine the sidelink resource for the sidelink operation on the frequency.

For each frequency of the one or more frequencies, a list of priority levels (e.g., a list of priority values) or one or more priority levels/values of a sidelink operation on a frequency may be provided. For example, a list of priority levels or priority value(s) or logical channel(s) of the sidelink operation on the frequency may be indicated.

For each frequency of the one or more frequencies, a list of periodicity or one o more periodicities of sidelink transmission of a sidelink operation on a frequency may be indicated. For each frequency of the one or more frequencies, a number of estimated sidelink devices on a frequency may be indicated.

The location of the wireless device may be used in some aspects. The base station or the AP may utilize the information to determine one or more of the following. The information may be used to determine whether to block sidelink operation on one or more frequencies. The base station or the AP may indicate to the wireless device to stop sidelink operation or stop sidelink transmission on the one or more frequencies. The information may be used to determine whether to change the frequency for Uu operation or WLAN operation. The base station or the AP may switch the operating channel of the Uu operation (cellular communication) or the WLAN operation when the channel becomes congested due to sidelink operation. The information may be used to determine one or more time domain resources not usable by the sidelink operation on a frequency. Multiple patterns may be given for a frequency. Multiple information on one or more frequencies may be provided. For example, the one or more time domain resources may be indicated via a time-domain division (TDD) downlink-uplink (DL-UL) pattern, where sidelink operation may not be allowed in downlink (DL) resources of the pattern. As an example, the one or more time domain resources may be indicated via a slot format to indicate which slots are usable for sidelink operation and which slots are not usable for the sidelink operation. The slot format may be based on the timing of the sidelink operation. The slot format may be based on the timing of the Uu operation or the WLAN operation. The slot format may be based on the timing of the GPS/GNSS. The slot format may be based on a relative timing of the message (e.g., slot format starts from the time at receiving the message). For example, the one or more time domain resources may be indicated via a resource pool or one or more resource pool configurations. The wireless device may override sidelink resource pool(s) with the one or more time domain resources. Example UE assistance information is shown in FIG. 2.

Certain aspects are directed towards conditions for operating sidelink via an unlicensed spectrum. In an example aspect, a wireless device may be (pre-) configured with a sidelink frequency on the unlicensed spectrum that is not ITS spectrum. The wireless device may operate or may be allowed to transmit sidelink control/data via the sidelink frequency based on one or more criteria/conditions being met. The one or more criteria/conditions may comprise one or more of the following. The wireless device may not detect any synchronization signal and/or beacon on the sidelink frequency. The wireless device may be able to support the detection of the synchronization signal and/or the beacon. This is to determine whether any Uu operation or WLAN operation in the sidelink frequency may exist. The wireless device may determine no synchronization signal and/or the beacon on the sidelink frequency in response to searching [f1, f2] frequency range where the [f1, f2] comprise a frequency of NR BWP or WLAN channel that may overlap with the sidelink frequency. For example, the sidelink frequency may be [f3, f4] where f3 is the lowest frequency of the sidelink frequency and f4 is the highest frequency of the sidelink frequency. A frequency f1 may be determined as f3−X where X is the maximum bandwidth of the NR BWP (e.g., 400 MHZ) and/or a maximum bandwidth of a WLAN channel (e.g., 160 MHz or 320 MHZ). A frequency f2 may be determined as f4+Y where Y is a maximum bandwidth of the NR BWP and/or a maximum bandwidth of a WLAN channel. For example, X=Y. For example, X=Y=400 MHz. For example, X=Y=320, or 160 MHz.

As an example, a wireless device may determine no Uu operation or WLAN operation in an unlicensed spectrum based on not detecting system information block(s) (SIB(s)) or beacons or a COT indication via the unlicensed spectrum. The wireless device may operate sidelink in the unlicensed spectrum in response to determining no Uu operation. The wireless device may operate sidelink in the unlicensed spectrum in response to determining no WLAN operation.

A base station or an AP may indicate 'sidelink operation barring' information via SIB(s) or a beacon. A wireless device may operate sidelink operation, in a frequency, as long as the sidelink operation barring is not enabled in the frequency; or the SIB(s) or the beacon indicates sidelink operation barring is disabled (or not enabled) in the frequency; or sidelink operation is explicitly enabled in the frequency. The sidelink operation barring may be indicated for a sidelink frequency. The SIB(s) or the beacon may comprise one or more (e.g., a list of) sidelink operation barring where each sidelink operation barring information applies to each sidelink frequency (e.g., indicating whether the frequency is barred for sidelink communication).

A wireless device may operate sidelink operation on a sidelink frequency when the wireless device is not connected to a base station or an AP of a carrier where the carrier partially or fully overlaps with the sidelink frequency. The wireless device may be in RRC IDLE/INACTIVE state with the base station or not associated with the AP. In this case, the sidelink operation may be allowed in the sidelink frequency.

A wireless device may operate sidelink operation on a sidelink frequency when the wireless device is not camped on (e.g., RRC IDLE) a carrier where the carrier partially or fully overlaps with the sidelink frequency. The wireless device may be allowed to operate sidelink on the sidelink frequency when the wireless device is not camped on the carrier overlapping with the sidelink frequency.

A wireless device may operate sidelink on a sidelink frequency when the wireless device is not connected or maintained in RRC INACTIVE state to a base station or an AP of a carrier where the carrier partially or fully overlaps with the sidelink frequency. The wireless device may be in RRC IDLE or not associated with the AP. In this case, the sidelink operation may be allowed. FIG. 3 illustrates an example barring configuration via SIB12 for sidelink configuration. sl-access-barring may indicate whether barring is disabled or enabled for each frequency of the sequence of number of sidelink frequencies (FreqSL). In an example, if sl-access-barring [x] indicates enabled, sidelink operation is barred in a frequency which is x-th frequency of one or more sidelink frequencies (pre-) configured to the wireless device.

Figure 4:
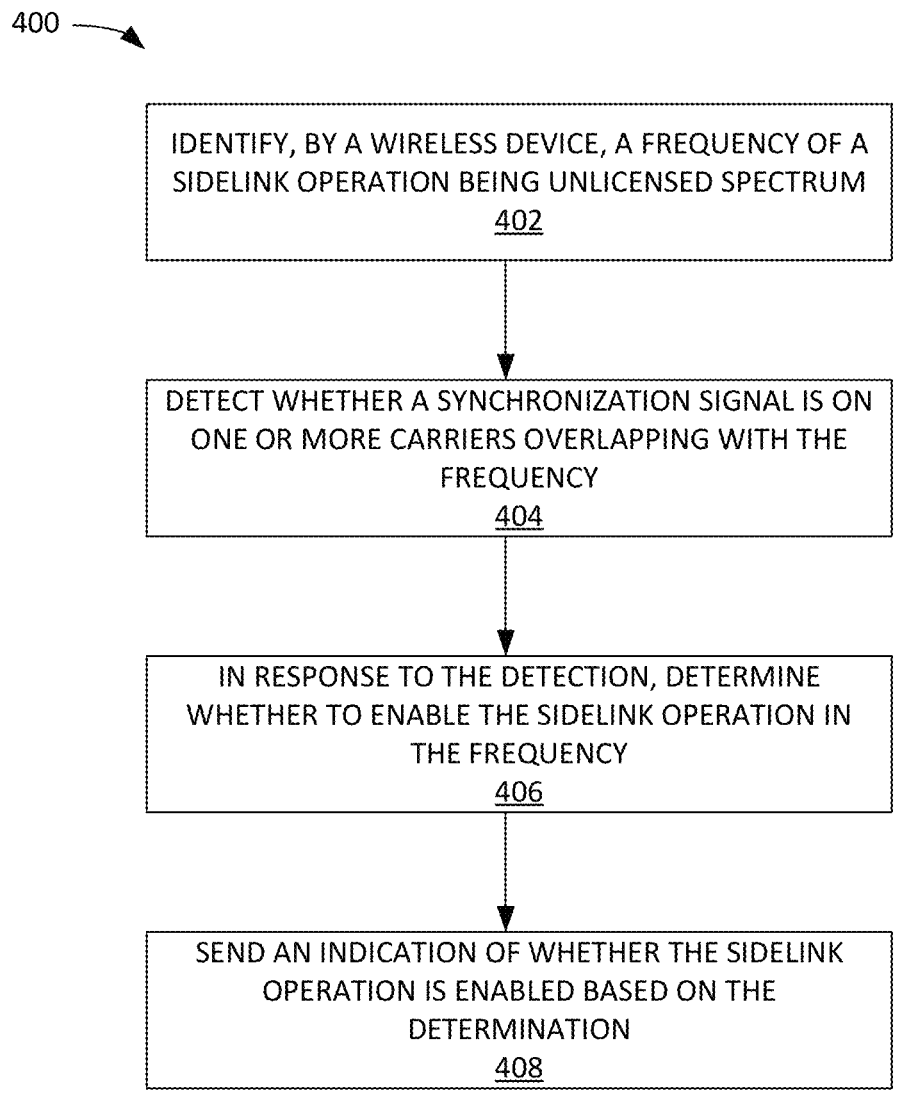
FIG. 4 is a flow diagram illustrating example operations for wireless communication, in accordance with certain aspects of the present disclosure, in accordance with certain aspects of the present disclosure.

FIG. 4 is a flow diagram illustrating example operations 400 for wireless communication, in accordance with certain aspects of the present disclosure. The operations 900 may be performed by a wireless device (e.g., UE 120).

At block 402, the wireless device identifies a frequency of a sidelink operation being an unlicensed spectrum. For example, the wireless device may determine the frequency being the unlicensed spectrum based on a band number of the frequency. For example, the wireless device may determine the frequency being the unlicensed spectrum based on the frequency (e.g., whether the frequency belongs to one or more unlicensed frequency regions). For example, the wireless device may determine the frequency being the unlicensed spectrum based on (pre-) configuration of a sidelink BWP related to the frequency. At block 404, the wireless device determines whether a synchronization/beacon signal, transmitted by a base station or an AP, detected is on one or more carriers overlapping with the frequency.

At block 406, the wireless device, in response to the determination, determines whether to enable the sidelink operation in the frequency. For example, determining whether to enable the sidelink operation may involve determining to disable the sidelink operation in response to detecting that the synchronization signal is on the one or more carriers overlapping with the frequency.

In some aspects, determining whether to enable the sidelink operation may involve determining to enable the sidelink operation in response to detecting that the synchronization signal is absent on the one or more carriers. In this case, the wireless device may communicate sidelink traffic via the frequency in response to the sidelink operation being enabled.

At block 408, the wireless device sends an indication of whether the sidelink operation is enabled based on the determination. For example, the indication may be sent to a higher layer (such as medium access control (MAC) layer or radio resource control (RRC) layer) of the wireless device.

Some aspects are directed towards a frequency priority list with associated conditions. In an example aspect, a wireless device may be (pre-) configured with a list of sidelink frequency information, where each frequency may be associated with zero or one or more (conditions. When (pre-) configured with the one or more conditions on a sidelink frequency, the wireless device may operate or may transmit sidelink traffic on the sidelink frequency in response to the one or more conditions being met or only when the one or more conditions are met.

For example, the one or more conditions may comprise one or more of the following conditions. The one or more conditions may comprise one or more zones/regions/areas where sidelink operation is allowed on the sidelink frequency. A zone may be indicated with a zone identifier and a zone length (e.g., sl-ZoneLength). A zone identifier of the wireless device may be determined based on a location of the wireless device. For example, xi and yi may indicate the geographical location. X may be the geodesic distance in longitude between the wireless device's current location and geographical coordinates (0, 0) according to WGS84 model and may be expressed in meters and y may be the geodesic distance in latitude between the wireless device's current location and geographical coordinates (0, 0) according to WGS84 model and may be expressed in meters. xi may be equal to floor (x/the zone length L) modulo 64 and yi may be equal to floor (y/L) modulo 64 (e.g., where 3 modulo 2 is 1). The zone identifier may be determined as zone_id=yix 64+xi. When the zone_id is comprised in the one or more zones, the wireless device may operate sidelink operation in the sidelink frequency. Alternatively, the one or more zones may be configured where the wireless device is not allowed to operate sidelink operation while the zone_id of the wireless device is comprised in the one or more zones. The wireless device may operate when the zone_id is not part of the one or more zones, in some aspects.

In some aspects, the one or more conditions may comprise one or more geographical locations where the sidelink operation is (or is not) allowed on the sidelink frequency. Similar to zones, the wireless device may operate or may not operate sidelink operation/transmission in the sidelink frequency based on its geographical location. The one or more geographical locations may comprise one or more of {longitude, latitude} or one or more of {longitude, latitude, height}.

In some aspects, the one or more conditions may comprise a threshold of a busy ratio, where a sidelink operation may be allowed when a busy ratio of one or more frequencies is lower than or equal to the threshold. The busy ratio may be the ratio between the time a channel (e.g., a frequency band) is sensed as busy and the total observation time. The one or more frequencies may be determined based on one or more Uu carriers or WLAN channels where each Uu carrier or WLAN channel may partially or fully overlap with the sidelink frequency. Alternatively, the wireless device may be allowed to operate sidelink when busy ratio of any frequency of the one or more frequencies is lower than or equal to the threshold. Alternatively, the wireless device may be allowed to operate sidelink when busy ratio of any frequency of the one or more frequencies is higher than the threshold. Alternatively, the wireless device may be allowed to operate sidelink when busy ratio(s) of the one or more frequencies are higher than the threshold.

The one or more conditions may comprise a channel occupancy time threshold. Similar to a threshold of a busy ratio, a threshold of a channel occupancy time may be configured, where a sidelink operation may be allowed when the channel occupancy time of one or more frequencies is lower than or equal to the threshold. The one or more frequencies may be determined based on one or more Uu carriers or WLAN channels where each Uu carrier or WLAN channel may partially or fully overlap with the sidelink frequency. Alternatively, the wireless device may be allowed to operate sidelink when the channel occupancy time of any frequency of the one or more frequencies is lower than or equal to the threshold. Alternatively, the wireless device may be allowed to operate sidelink when the channel occupancy time of any frequency of the one or more frequencies is higher than the threshold. Alternatively, the wireless device may be allowed to operate sidelink when channel occupancy time(s) of the one or more frequencies are higher than the threshold.

In some aspects, the one or more conditions may comprise a presence of NR-U operation or a presence of a base station where a wireless device is allowed to operate sidelink on the sidelink frequency in response to detecting a base station or NR-U carrier on any of one or more frequencies. The one or more frequencies may comprise the frequency of a carrier overlapping with the sidelink frequency.

In some aspects, the one or more conditions may comprise a non-presence of NR-U operation or a non-presence of a base station where a wireless device is allowed to operate sidelink on the sidelink frequency in response to detecting no base station or no NR-U carrier on any of one or more frequencies. The one or more frequencies may comprise a frequency of a carrier overlapping with the sidelink frequency.

In some aspects, the one or more conditions may comprise a presence of WLAN operation or a presence of an AP where a wireless device is allowed to operate sidelink on the sidelink frequency in response to detecting an AP or WLAN channel on any of one or more frequencies. The one or more frequencies may comprise a frequency of a channel overlapping with the sidelink frequency.

In some aspects, the one or more conditions may comprise a non-presence of WLAN operation or a non-presence of an AP where a wireless device is allowed to operate sidelink on the sidelink frequency in response to detecting no AP or no WLAN channel on any of one or more frequencies. The one or more frequencies may comprise a frequency of a channel overlapping with the sidelink frequency.

In some aspects, sidelink access may be barred in certain scenarios. For example, a wireless device may be allowed to operate sidelink on the sidelink frequency either only outdoors or indoors. The wireless device may determine outdoor or indoor based on ability to connect to GPS. A wireless device may be allowed to operate sidelink on the sidelink frequency either only when moving or when keeping/fixed. The wireless device may determine a fixed device based on capability or wall-mounted power or pre-configured. The wireless device may be considered mobile unless it's determined to be fixed.

Figure 5:
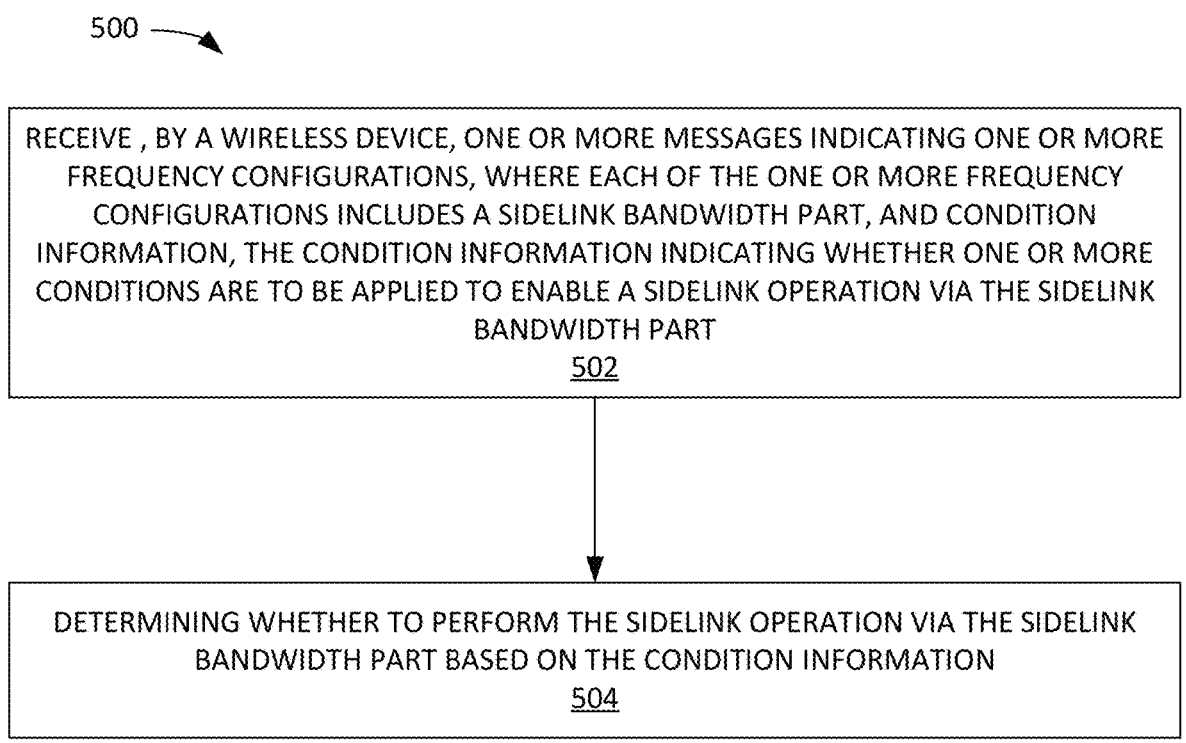
FIG. 5 is a flow diagram illustrating example operations for wireless communication, in accordance with certain aspects of the present disclosure, in accordance with certain aspects of the present disclosure.

FIG. 5 is a flow diagram illustrating example operations 500 for wireless communication, in accordance with certain aspects of the present disclosure. The operations 500 may be performed by a wireless device (e.g., UE 120).

At block 502, the wireless device receives one or more messages indicating one or more frequency configurations. Each of the one or more frequency configurations may comprise a sidelink bandwidth part and condition information. The condition information may indicate whether one or more conditions are to be applied to enable a sidelink operation via the sidelink bandwidth part. Each of the one or more frequency configurations may also indicate a frequency band, the sidelink bandwidth part being in the frequency band.

At block 504, the wireless device determines whether to perform the sidelink operation via the sidelink bandwidth part based on the condition information. In some aspects, the condition information indicates a condition for enabling the sidelink operation. The wireless device may communicate sidelink traffic based on the condition being met.

In some aspects, the one or more conditions may comprise a location (e.g., coordinates, such global positioning system (GPS) coordinates, of the wireless device) associated with the wireless device or a zone (e.g., a region within which the wireless device may be located) associated with the wireless device. For example, the zone may be a rectangular region or any region that may correspond to a property line (e.g., conference hall). The one or more conditions may comprise a busy ratio associated with the sidelink bandwidth part meeting a busy ratio threshold, one or more channel occupancy times associated with the sidelink bandwidth part meeting a channel occupancy time threshold, a presence or absence of a base station communicable with the wireless device, or a presence or absence of a wireless access point communicable with the wireless device. Any combination of the described conditions may be used.

In some aspects, the one or more frequency configurations may indicate one or more frequencies within an unlicensed spectrum/an unlicensed band. The one or more frequency configurations may indicate one or more frequencies with a licensed spectrum/a licensed band. The one or more frequency configurations may indicate one or more frequencies with a shared spectrum/a shared band.

Figure 6A:
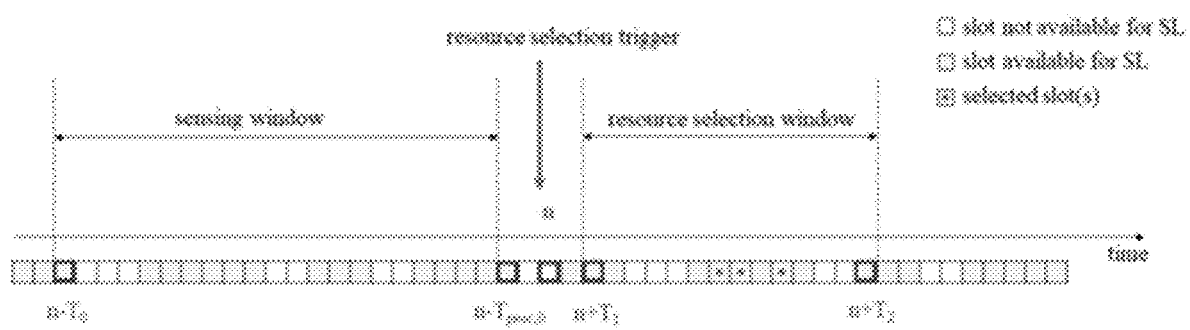
FIG. 6A illustrates an example sensing window for transmission of sidelink traffic, in accordance with certain aspects of the present disclosure.

Certain aspects of the present disclosure are directed towards techniques for sidelink resource reservation. In existing technologies, sidelink operation (e.g., vehicle to everything (V2X) communication protocol) may support mode 2 resource selection mechanism (e.g., mode 2 operation mode). The mode 2 resource selection mechanism may be based on sensing resources and selecting resources by a wireless device. Compared to mode 1 operation mode, the wireless device may determine sidelink resources by itself. For example, a wireless device may have sidelink traffic to transmit and the wireless device may sense during a sensing window, as shown in FIG. 6A. The wireless device may receive one or more sidelink control information (SCI) from one or more other wireless devices. The one or more SCIs indicate resources for scheduled data as well as reserved resources based on a resource reservation period. For example, an SCI may indicate one or more initial/retransmission resources in a resource selection window and a resource reservation period. Based on a resource selection, the wireless device may transmit sidelink traffic via one or more resources/intervals based on the resource reservation period.

Figure 6B:
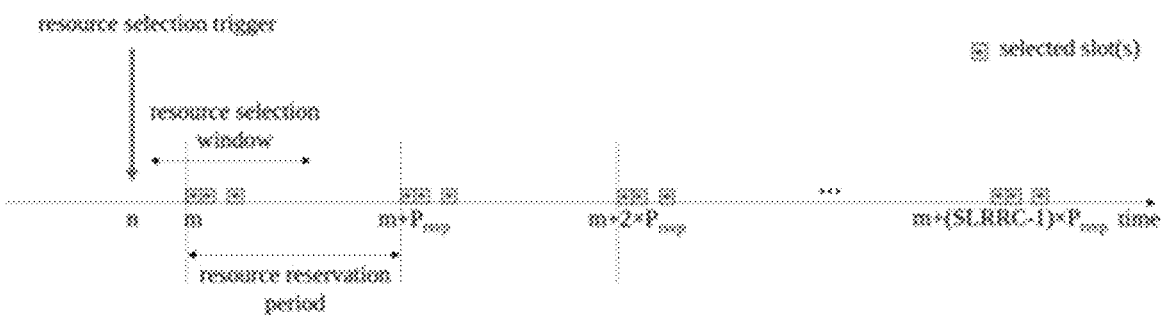
FIG. 6B illustrates example techniques for reserving sidelink resources, in accordance with certain aspects of the present disclosure.

FIG. 6B illustrates how sidelink may reserve/schedule/assign resources. For example, an SCI may indicate one or more of the following. In some aspects, 3 bits may be provided to indicate a priority value of sidelink data scheduled by the SCI. Value '000' of a priority field may correspond to priority value '1', value '001' of a priority field may correspond to priority value '2', and so on.

In some aspects, frequency resource assignment may be determined per expression:

$$\left\lceil \log_2\left(\frac{N_{subChannel}^{SL}\left(N_{subChannel}^{SL}+1\right)}{2}\right)\right\rceil \text{ bits}$$

when the value of the higher layer parameter sl-MaxNumPerReserve is configured to 2; otherwise:

$$\left\lceil \log_2\left(\frac{N_{subChannel}^{SL}\left(N_{subChannel}^{SL}+1\right)\left(2N_{subChannel}^{SL}+1\right)}{6}\right)\right\rceil \text{ bits}$$

when the value of the higher layer parameter sl-MaxNumPerReserve is configured to 3. This may allocate frequency domain resources in an interval for initial/retransmission for each period, where each period is separated by a resource reservation period.

Time resource assignment may be 5 bits when the value of the higher layer parameter sl-MaxNumPerReserve is configured to 2; otherwise 9 bits when the value of the higher layer parameter sl-MaxNumPerReserve is configured to 3. This may indicate time domain resources of initial/transmission within the interval.

Resource Reservation Period May be:

$$\lceil \log_2 N_{rsv\_period} \rceil \text{ bits}$$

where $N_{rsv\_period}$ is the number of entries in the higher layer parameter sl-ResourceReservePeriodList, if higher layer parameter sl-MultiReserveResource is configured; 0 bit otherwise. DMRS pattern may be:

$$\lceil \log_2 N_{pattern} \rceil \text{ bits}$$

where $N_{pattern}$ is the number of DMRS patterns configured by higher layer parameter sl-PSSCH-DMRS-TimePatternList. The 2nd-stage SCI format may be 2 bits. Beta_offset indicator may be 2 bits as provided by higher layer parameter sl-BetaOffsets2ndSCI. The number of DMRS ports may be 1 bit. Modulation and coding scheme may be 5 bits. Additional MCS table indicator may be 1 bit if one MCS table is configured by higher layer parameter sl-Additional-MCS-Table; 2 bits if two MCS tables are configured by higher layer parameter sl-Additional-MCS-Table; 0 bit otherwise. PSFCH overhead indication may be 1 bit if higher layer parameter sl-PSFCH-Period=2 or 4; 0 bit otherwise. Reserved may be a number of bits as determined by higher layer parameter sl-NumReservedBits, with a value set to zero. In some aspects, the wireless device may receive one or more SCIs that determine one or more resources in an interval for sidelink initial/retransmission resources in the interval, and also reservation period to indicate resource(s) for reserving in a periodic manner.

In existing technologies, a wireless device may transmit sidelink transmission (initial and/or retransmission) on one or more resources selected by the resource selection. The wireless device may transmit the next sidelink transmission in the next interval/period based on a reservation period without selecting the resource. Periodic (at least in time domain) resources may be selected in the next interval/period.

When sidelink operation occurs in an unlicensed spectrum with channel access mechanisms (such as listen before talk (LBT)), selected resources for a sidelink transmission may or may not be used for the sidelink transmission depending on the channel access status. For example, when a wireless device selects slots n, n+2 and n+3 in a first period for three sidelink initial/retransmissions, the wireless device may not acquire the channel at the slot n (e.g., channel is busy at the slot n), the wireless device may postpone a first transmission to slot n+1. An SCI of a sidelink transmission scheduled via slot n may indicate a periodicity P. When the sidelink transmission is postponed to slot n+1, this may reserve resource in slot n+1+P where the wireless device intends to reserve resources in slot n+P.

When the wireless device defers sidelink transmission due to listen before talk (LBT)/channel access mechanism, indicated reserved periodicity becomes ambiguous. Sensing mechanisms to avoid resource collision based on ambiguous periodicities/reserved resources may lead to unnecessary high channel utilization, more collision, or inaccurate resource selection mechanism. Enhancements on existing resource selection and transmission mechanisms for sidelink transmission may be needed to operate in the unlicensed spectrum based on channel sensing mechanisms such as the LBT scheme. There are different types of LBT that may be used, including category 1 LBT, category 2 LBT, category 3 LBT and category 4 LBT. Category 1 LBT may require no sensing or very short sensing periodicity, category 2 LBT may require a fixed sensing period without random back-offs, and categories 3 and 4 LBTs may have variable sensing periods and random back-offs.

In certain aspects of the present disclosure, a wireless device may select one or more sidelink resources/slots in each period with a reservation period (P). For example, a first sidelink resource/slot, a second sidelink resource/slot and a third sidelink resource/slot may be provided in each period. The wireless device may be allowed to transmit a sidelink transmission in any of the first sidelink resource/slot, the second sidelink resource/slot and the third sidelink resource/slot as long as the wireless device acquires the channel in those resources. Otherwise, the wireless device may skip transmission. This may allow consistent reservation periodicity/periodic reservation regardless of LBT/channel access mechanism. This may reduce the number of successful sidelink transmissions due to the channel access mechanism.

In some aspects, a wireless device may indicate 'delay' in an SCI in response to postponing a sidelink transmission. For example, when a sidelink resource is scheduled in slot n, where actual LBT success occurs at slot n+2, the wireless device may indicate delay=2 in the SCI for the sidelink transmission. A second wireless device may receive the SCI, consider a reservation period P with the delay, and determine the next interval as slot n+P instead of slot n+2+P. This may improve the reliability of sidelink transmission and reduce the number of drops due to LBT failure. This may guarantee a periodic resource reservation mechanism. This, however, may lead to higher latency of sidelink transmission and may sometimes lead to failure of meeting the deadline of a sidelink transmission.

In an example, a wireless device may have one or two starting symbols in a slot for a sidelink transmission in the slot. For example, when two starting symbols are available in the slot, a first symbol (e.g., $2^{nd}$ symbol of the slot) and a second symbol (e.g., 8th symbol of the slot) may be used as an initial symbol for a sidelink transmission in the slot. The wireless device may perform LBT in the first symbol. In response to LBT success, the wireless device may transmit the sidelink transmission from the first symbol. In response to LBT failure, the wireless device may perform another LBT on the second symbol. In response to the success of performing the other LBT on the second symbol, the wireless device may transmit the sidelink transmission from the second symbol. A second wireless device may receive the sidelink transmission starting from the second symbol with a reservation period P. The second wireless device may determine a reserved resource based on the first symbol and the P regardless whether the second wireless device receives the sidelink transmission or a SCI starting from the first symbol or the second symbol. For example, the first symbol may be determined based on a sl-startingSymbol configuration. The second symbol may be determined based on a sl-secondStartingSymbol configuration (if given). In terms of determining reserved resources, the first symbol or the sl-startingSymbol configuration is used regardless of whether the SCI is transmitted starting from the first symbol or the second symbol (or from the sl-startingSymbol or the sl-secondStargingSymbol).

In some aspects, when a sidelink resource fails with LBT, a wireless device may consider the sidelink resource as a preempted resource and may trigger resource reselection. For a current period, the wireless device may skip transmission on the LBT failure resource and may trigger resource reselection. As one example, the wireless device may postpone sidelink transmission due to LBT failure, and may trigger a resource reselection, based on a similar procedure of resource reselection in response to pre-empted resource.

In some aspects, a wireless device may skip transmission based on LBT failure. For example, a wireless device may select one or more sidelink resources for a sidelink transport block (TB) in a period. The wireless device may select the one or more sidelink resources based on sl-MaxNumPerReserve parameter. The sl-MaxNumPerReserve may be configured by a base station or may be pre-configured or may be configured by another wireless device. The sl-MaxNumPerReserve may be configured for a resource pool or may be configured for a frequency or for a sidelink bandwidth part (BWP) or for a sidelink operation or for each logical channel or for each priority value or for each logical channel priority. For example, when sl-MaxNumPerReserve is two (2), the wireless device may select two sidelink resources/slots in the period. A sidelink resource may refer one or more PRBs in a slot, where one sidelink shared channel (PSSCH) may be transmitted via the sidelink resource. A sidelink resource may refer to a time/frequency domain resource used for a single PSSCH transmission (with or without associated sidelink control channel (PSCCH) of a sidelink control information).

Figure 7:
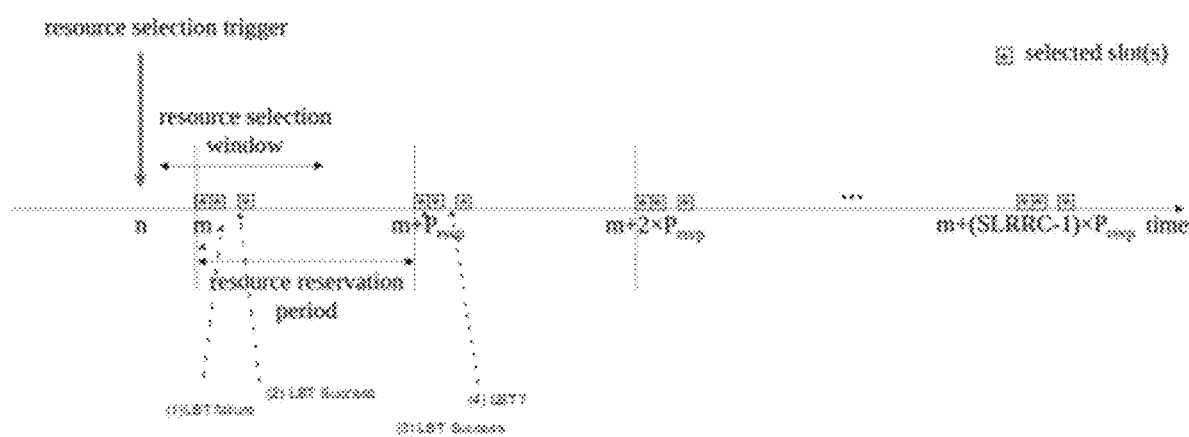
FIG. 7 illustrates example techniques for resource selection, in accordance with certain aspects of the present disclosure.

FIG. 7 illustrates example techniques for resource selection, in accordance with certain aspects of the present disclosure. For example, a wireless device may trigger a resource selection in a slot n. The wireless device may select three resources in a slot m (e.g., slot m, m+1, and slot m+3) with three transmissions in each reservation period. The wireless device may determine a reservation period as Prsvp. The wireless device may determine slot m+Prsvp, m+1+Prsvp, m+3+Prsvp as sidelink resources in the next reservation period, and so on. The wireless device may perform an LBT before or at the slot m for a first sidelink transmission. The wireless device may determine an LBT is failed if the channel is busy. In response to determining LBT failure for the slot m, the wireless device may determine to drop the first sidelink transmission. For example, in response to LBT failure, the wireless device drops the first sidelink transmission at the slot m. The wireless device may perform another LBT before or at the slot m+1 for a second sidelink transmission attempt. The wireless device may determine a second LBT failure for the slot m+1. The wireless device may skip/drop the second sidelink transmission in response to the LBT failure. In an example, the wireless device may transmit one or more sidelink transport blocks via one or more resources in a resource reservation period/internal. Each transport block of the one or more sidelink transport blocks may be repeated in one or more times.

Certain aspects are directed towards techniques for handling a gap between sidelink resources in a period. The wireless device may or may not perform an LBT for a slot m+2 as there is no scheduled sidelink transmission on the slot m+2, as shown in FIG. 7. When the wireless device performs the LBT for the slot m+2, and LBT succeeds for the slot m+2, the wireless device may transmit a dummy signal to secure the slot m+2, and may continue transmission on a third sidelink transmission on slot m+3.

In one example, a wireless device may determine one or more sidelink resources in each reservation period, where the one or more sidelink resources may be contiguous in time domain. For example, the one or more sidelink resources may be contiguous in slot domain where the one or more sidelink resources are determined in consecutive sidelink slots/slots. As used herein, a sidelink slot generally refers to any slot that may be used for sidelink communication. The terms "slot" and "sidelink slot" may be used interchangeably herein. Sidelink slots may be one or more slots allocated for sidelink operation based on a sidelink resource pool. The one or more sidelink resources may be contiguous in time domain (e.g., contiguous slots) where no gap/gap slot between sidelink resources is assumed. Sidelink feedback resources may be assumed in one or more sidelink slots where the wireless device may not allocate/select one or more second sidelink resources that overlap with any sidelink feedback resource. For example, a wireless device may transmit sidelink feedback based on a short (e.g., Category 2) LBT or no LBT. A first wireless device may skip transmission on allocated sidelink feedback resources and consider gaps between sidelink resources due to sidelink feedback resources as valid gaps.

As an example, a wireless device may perform an LBT in each transmission gap in time domain. For example, a transmission gap may be considered as a discontinuous transmission between two sidelink transmissions that is larger than X us (e.g., 100 us) or Y orthogonal frequency-division multiplexing (OFDM) symbols (e.g., 2 OFDM symbols) or Z msec (e.g., 1 msec). When a gap between two sidelink resources/transmissions is less than the transmission gap or a threshold of transmission gap (e.g., X us, Y symbols, Z msec), the wireless device may continue sidelink transmissions without performing category 4 LBT (e.g., the wireless device may perform category 2 LBT for the next sidelink transmission after any gap).

Figure 8:
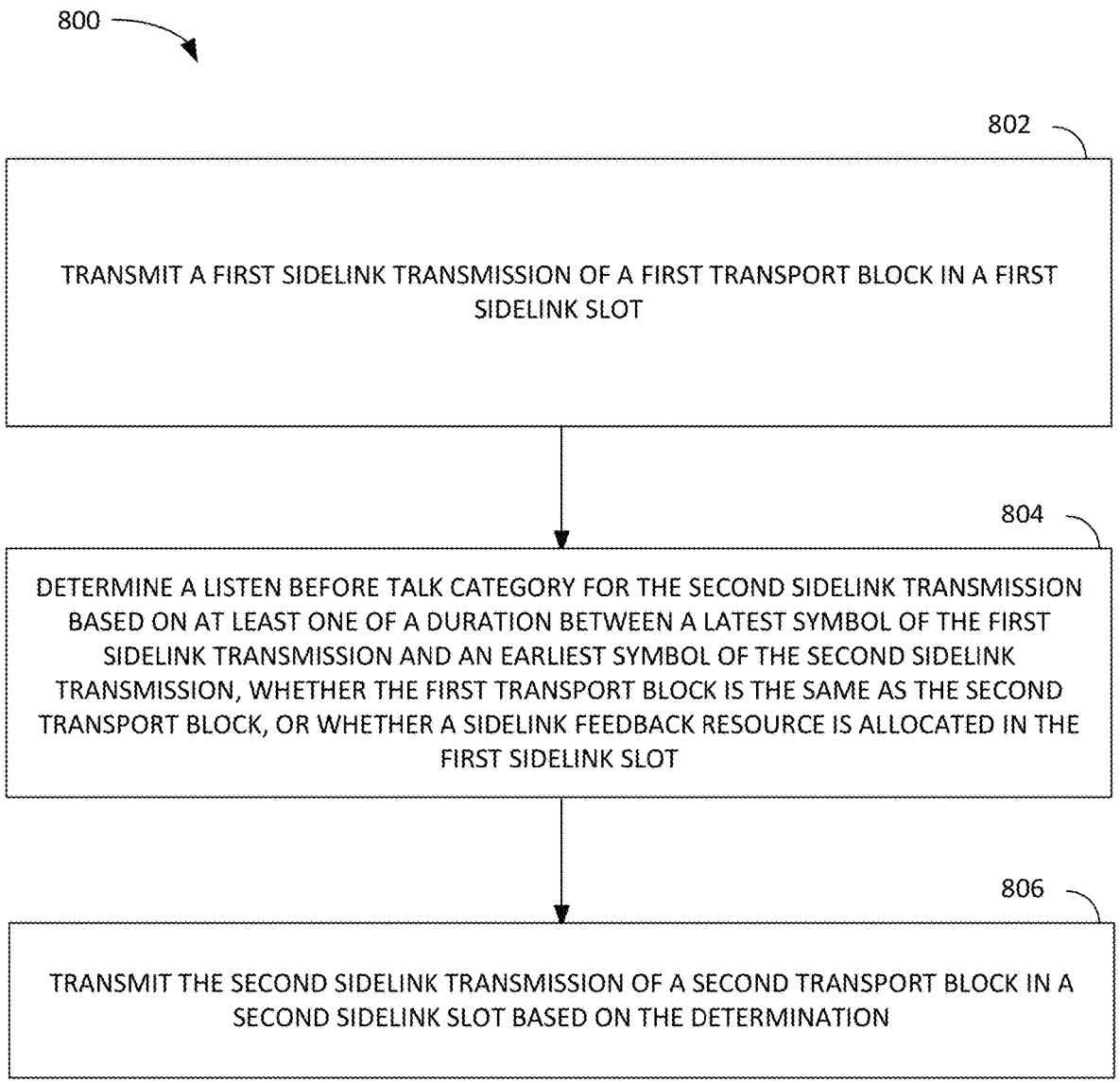
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed by a wireless device (e.g., UE 120).

At block 802, the wireless device transmits, by a wireless device, a first sidelink transmission of a first transport block in a first slot. At block 804, the wireless device determines a listen before talk category for the second sidelink transmission. The listen before talk category may be determined based on a duration between a latest symbol of the first sidelink transmission and an earliest symbol of the second sidelink transmission, whether the first transport block is the same as the second transport block, or whether a sidelink feedback resource is allocated in the first slot. For example, the listen before talk category may be based on condition 1) a duration between a latest symbol of the first sidelink transmission and an earliest symbol of the second sidelink transmission, condition 2) whether the first transport block is the same as the second transport block, condition 3) whether a sidelink feedback resource is allocated in the first slot, or any combination of these conditions.

At block 806, the wireless device transmits the second sidelink transmission of a second transport block in a second slot based on the determination. The wireless device may perform listen before talk for the second sidelink transmission in accordance with the listen before talk category. The second sidelink transmission may be transmitted in response to success of the listen before talk. The listen before talk category may be one of category 2 LBT, category 4 LBT, or no LBT.

In some aspects, the listen before talk category is category 2 LBT or no LBT based on at least one of the duration being less than a time threshold or less than a number of symbols or the first transport being the same as the second transport block.

In some aspects, the listen before talk category is category 2 LBT or no LBT based on the sidelink feedback resource not being allocated in the first slot. The listen before talk category may be category 4 LBT based on the duration being greater than a time threshold or greater than a number of symbols, or the first transport being different than the second transport block. In some aspects, the listen before talk category is category 4 LBT based on the sidelink feedback resource being allocated in the first slot.

In some aspects, the wireless device may determine the latest symbol of the first sidelink transmission based on a sidelink feedback resource in the first slot. The latest symbol may be a last symbol including the sidelink feedback resource of the first slot. The wireless device may determine the latest symbol of the first sidelink transmission as the last symbol including the sidelink feedback resource of the first slot in response to the sidelink feedback resource being present in the first slot.

Figure 9:
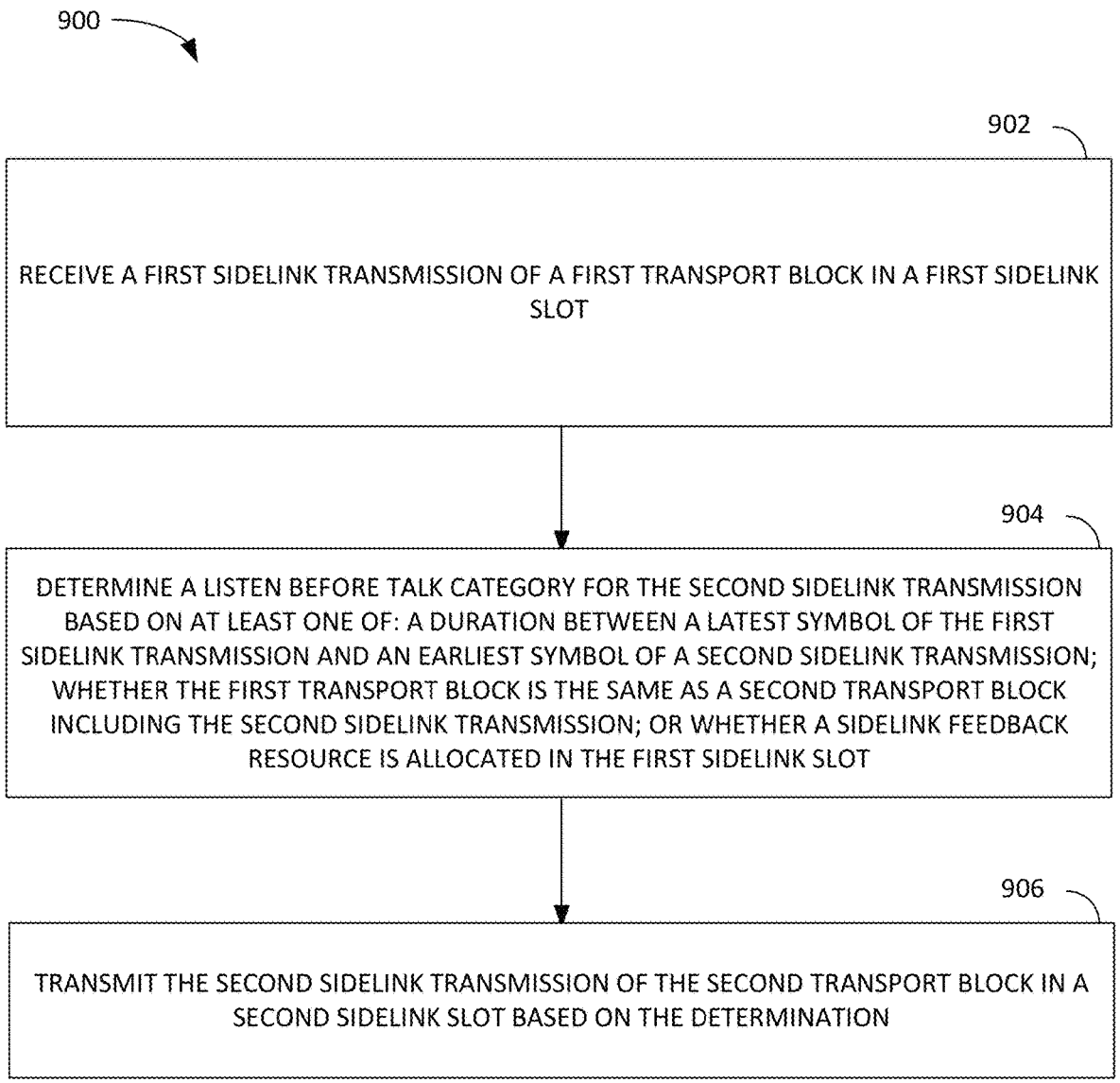
FIG. 9 is a flow diagram illustrating example operations for wireless communication, in accordance with certain aspects of the present disclosure.

FIG. 9 is a flow diagram illustrating example operations 900 for wireless communication, in accordance with certain aspects of the present disclosure. The operations 900 may be performed by a wireless device (e.g., UE 120).

At block 902, the wireless device receives a first sidelink transmission of a first transport block in a first slot. At block 904, the wireless device determines a listen before talk category for the second sidelink transmission based on at least one of a duration between a latest symbol of the first sidelink transmission and an earliest symbol of a second sidelink transmission, whether the first transport block is the same as a second transport block including the second sidelink transmission, or whether a sidelink feedback resource is allocated in the first slot.

At block 906, the wireless device transmits the second sidelink transmission of the second transport block in a second slot based on the determination. The wireless device may perform listen before talk for the second sidelink transmission in accordance with the listen before talk category. The second sidelink transmission may be transmitted in response to success of the listen before talk.

In some aspects, the listen before talk category is one of category 2 LBT, category 4 LBT, or no LBT. The listen before talk category may be category 2 LBT or no LBT based on at least one of the duration being less than a time threshold or less than a number of symbols, or the first transport being the same as the second transport block.

In some aspects, the listen before talk category is category 2 LBT or no LBT based on the sidelink feedback resource not being allocated in the first slot. The listen before talk category may be category 4 LBT based on: the duration being greater than a time threshold or greater than a number of symbols, or the first transport being different than the second transport block.

In some aspects, the listen before talk category is category 4 LBT based on the sidelink feedback resource being allocated in the first slot. The wireless device may determine the latest symbol of the first sidelink transmission based on a sidelink feedback resource in the first slot, wherein the latest symbol is a last symbol including the sidelink feedback resource of the first slot. The wireless device may determine the latest symbol of the first sidelink transmission as the last symbol including the sidelink feedback resource of the first slot in response to the sidelink feedback resource being present in the first slot.

Figure 10:
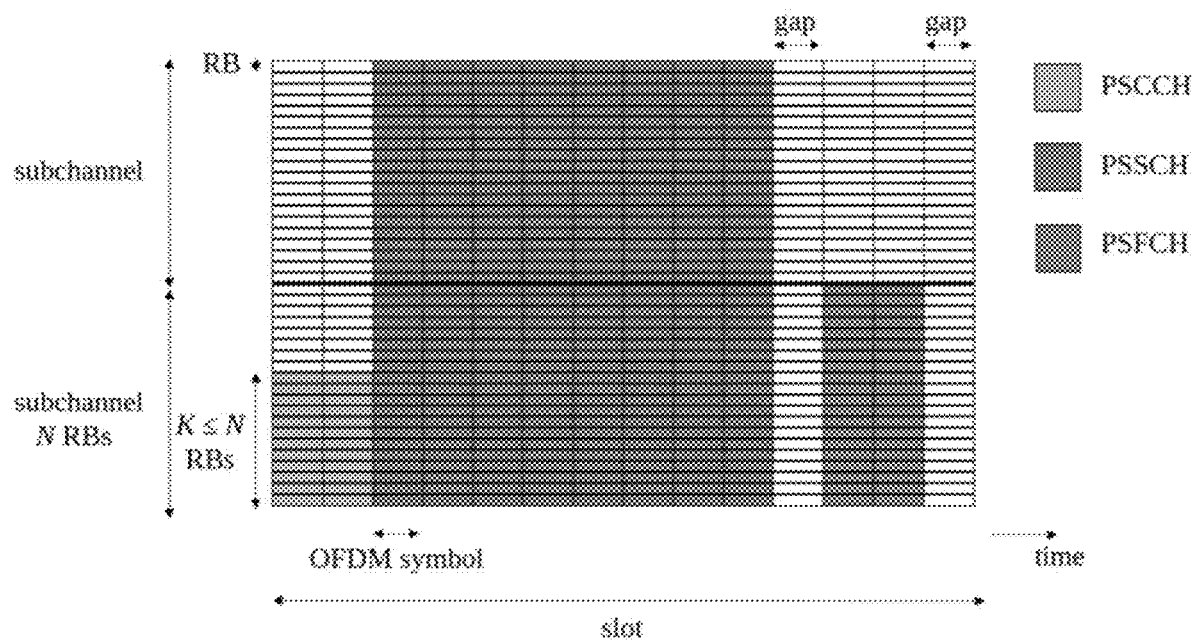
FIG. 10 shows an example slot structure for a sidelink slot allocated as a sidelink resource in a time domain, in accordance with certain aspects of the present disclosure.

FIG. 10 shows a slot structure for a sidelink slot allocated as a sidelink resource in a time domain. The slot structure may comprise physical sidelink control channel (PSCCH), physical sidelink shared channel (PSSCH), and physical sidelink feedback channel (PSFCH). One or more OFDM symbols in OFDM symbol 12/13 (last two symbols with one symbol gap) may be allocated as a sidelink feedback resource (e.g., sidelink feedback channel PSFCH). In an example, an earliest symbol may be determined based on a sl-startSymbol configuration which may be configured as one of 0, 1, 2, . . . , 6 (e.g., first symbol, second symbol, . . . $7^{th}$ symbol of a slot). A latest symbol may be determine based on the sl-startSymbol and sl-length. SI-startSymbol may indicate a first OFDM symbol in a slot for a sidelink transmission of PSSCH and/or PSCCH. SI-length may indicate a duration of the sidelink transmission of the PSSCH and/or the PSCCH. In an example, the feedback resources for PSFCH may be determined based on the sl-startSymbol and sl-length (e.g., last one or two symbols from the latest symbol). One symbol (e.g., last symbol) may be used as a gap between sidelink transmission for different timing advance/propagation delay and/or switching between reception and transmission. In an example, at least one symbol after the latest OFDM symbol may be used as a gap, where the latest OFDM symbol may be the $14^{th}$ symbol (in normal CP slot, and $12^{th}$ symbol in extended CP slot) in a slot or determined based on the sl-startSymbol and sl-length. Another symbol gap may be present between the sidelink data resource (PSSCH) and the feedback resource. Sidelink feedback resources may be allocated in each sidelink slot or every M sidelink slots (e.g., M=2 or M=3). When a sidelink slot has a feedback resource, sidelink control/data may reside in OFDM symbol 1-10 (first 10 OFDM symbols) (or sl-startSymbol+1 to sl-startSymbol+sl-length-3), and OFDM symbol 11 (or sl-startSymbl+sl-length-2) is a gap symbol, OFDM symbol 12-13 (sl-startSymbol+sl-length-2, sl-startSymbol+sl-length-1) are feedback resources, and OFDM symbol 14 (or sl-startSymbol+sl-length) is a gap symbol. When a sidelink slot has no feedback resource, sidelink control/data may reside in OFDM symbol 1-14 (at least when sidelink transmissions are contiguous in a next slot, following slot) (or sl-startSymbol+1, sl-startSymbol+sl-length), or may reside in OFDM symbol 1-13 (sl-startSymbol+1, sl-startSymbol+sl-length-1) with last symbol as a gap.

In some aspects, when a first sidelink transmission of a first transport block and a second transmission of a second transport block occur contiguously in the time domain (e.g., contiguous slots) without feedback resource allocated in a first slot of the contiguous slots and/or without any symbols not used either for the first transmission and the second transmission, the wireless device may assume no gap on the first slot. In an example, the first transport block may be same as the second transport block. The first transport block may be different from the second transport block. For example, a sl-startSymbol may be configured as zero or one (e.g., a first symbol or a second symbol is used as an earliest symbol of a transmission in a slot where the first symbol may be used as automatic gain control (AGC) in case of the second symbol being configured as the sl-startSymbol) and a sl-length may be configured as 14 or 13 or 12 (e.g., a sidelink transmission occupies an entire slot except for a gap symbol in the end of the slot). The wireless device may transmit the first sidelink transmission via all OFDM symbols of the first slot or may transmit via OFDM symbol 1-13. When the wireless device transmits the first sidelink transmission via the OFDM symbol 1-13, the wireless device may transmit a dummy signal or repeat one OFDM symbol of the OFDM symbol 1-13 via the OFDM symbol 14 that is assumed a gap in a sidelink slot format. In an example, the wireless device may be configured with multiple consecutive slot transmissions, where the wireless device may transmit one or more sidelink transmissions via a plurality of consecutive slots. For example, the wireless device may transmit a first transmission via the earliest/first slot of the plurality of consecutive slots without a gap symbol after PSSCH. The wireless device may transmit a last transmission via the latest/end slot of the plurality of consecutive slots with a gap symbol. For example, the wireless device may transmit three sidelink transmissions via three consecutive slots (e.g., slot m, m+1, m+2), where sl-startSymbol is configured as zero (or one) and a length is configured as 13 (or 14). The wireless device transmits a first sidelink transmission via slot m using a last symbol (e.g., a total transmission length of the first sidelink transmission is sl-length+1). The wireless device may transmit a last sidelink transmission via slot m+2 with a last symbol as a gap (e.g., a total transmission length of the last sidelink transmission is sl-length). In an example, a second wireless device receiving the three sidelink transmissions may assume that the first sidelink transmission occurs without a gap symbol (e.g., the total transmission length is sl-length+1) and the last sidelink transmission occurs with a gap symbol. In an example, the wireless device may be configured with sl-startSymbol-first and sl-length-first for a first sidelink slot where the first sidelink slot does not have adjacent prior or adjacent next sidelink slot (e.g., a first sidelink slot after at least one slot gap from previous sidelink slot for sidelink transmission), sl-startSymbol-second and sl-length-second for a second sidelink slot where the second sidelink slot has adjacent prior and adjacent next sidelink slots for sidelink transmission. SI-startSymbol-third and sl-legnth-third for a third sidelink slot which has the adjacent prior sidelink slot but does not have adjacent next sidelink slot for the sidelink transmission. For example, the second sidelink slot, AGC symbol and gap symbol may not be considered. For the first slot, AGC symbol is configured but no gap symbol is considered. For the third slot, AGC symbol is not considered, but gap symbol is considered.

Figure 11:
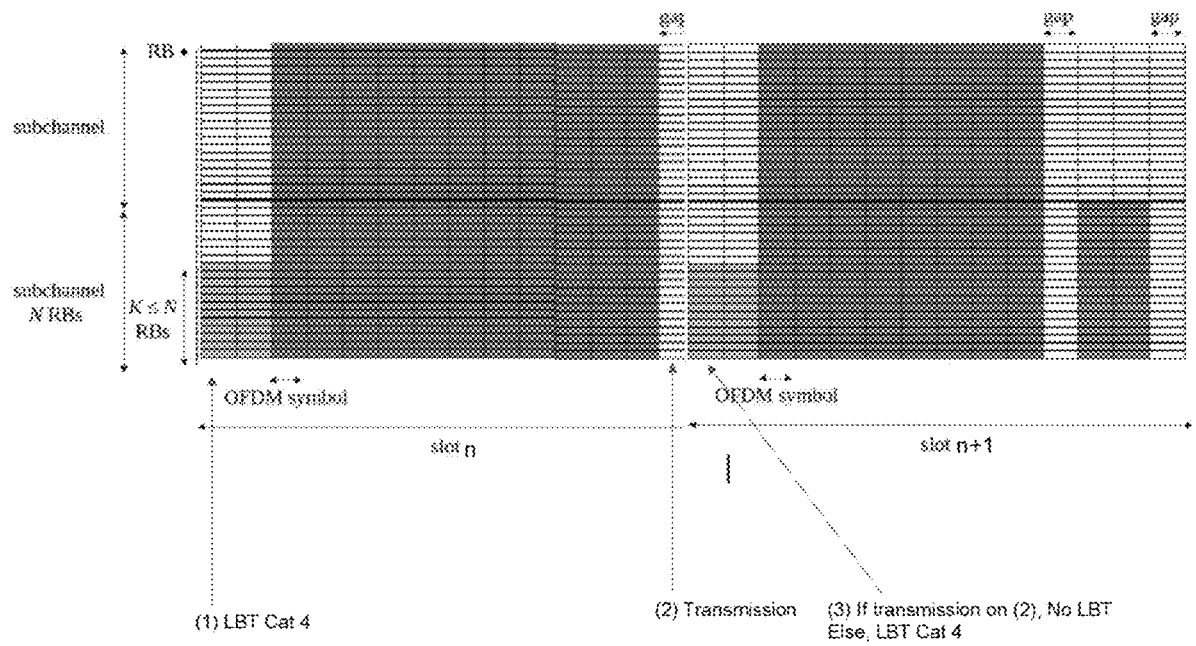
FIG. 11 shows the performance of a listen before talk (LBT) resulting in a sidelink transmission, in accordance with certain aspects of the present disclosure.

FIG. 11 shows the performance of an LBT resulting in a sidelink transmission, in accordance with certain aspects of the present disclosure. When two slots (e.g., slot n and slot n+1 in the above figure) are consecutively selected for two sidelink transmissions of a sidelink transport block, and a first slot of the two slots (e.g., slot n) does not have any sidelink feedback resource, a wireless device may transmit the transport block up to OFDM symbol 13 based on a sidelink slot format. A last symbol (OFDM symbol 14 of the first slot) may be considered as a gap.

A first SCI (e.g., PSCCH) in the first slot may indicate time/frequency domain resources of a first sidelink transmission via the first slot and a second sidelink transmission via a second slot of the two slots (e.g., slot n+1). When two slots are consecutively allocated for the transport block, receiver(s) may also assume that the last OFDM symbol of the first slot may be used for the first sidelink transmission. For example, when a second wireless device receives an SCI indicating a plurality of sidelink transmissions across consecutive two slots where a first slot of the consecutive two slots may not have feedback resource, the second wireless device may assume that a sidelink transmission via the first slot may continue until the last OFDM symbol (e.g., entire the first slot).

For example, a sidelink slot format may be maintained where the last OFDM symbol of a sidelink slot is considered a gap. In an example, the sidelink slot may be determined as a slot (e.g., 14 OFDM symbols as in the NR frame structure) or determined based on a sl-startSymbol and sl-length. In this case, the wireless device may transmit the first sidelink transmission until OFDM symbol 13 (or the last symbol of the sidelink slot), and may transmit the signal via the last OFDM symbol to occupy the channel. The signal may be a dummy signal or any repetition or reference signal or feedback or assistance information, and/or the like.

Before transmitting the first sidelink transmission at the slot n, the wireless device may perform Cat 4 LBT. When LBT succeeds, the wireless device transmits the first sidelink transmission via the slot n. When the wireless device transmits any signal via the last OFDM symbol, the wireless device may perform Cat 2 LBT or no LBT for a second sidelink transmission at the slot n+1. If the wireless device does not transmit any signal during the gap (e.g., in the OFDM symbol 14 of the first slot), the wireless device may perform Cat 4 LBT before the second sidelink transmission. The wireless device may perform Cat 2 LBT before the second sidelink transmission when a gap between first sidelink transmission and the second sidelink transmission is less than or equal to X us, Y symbols, or Z msec.

Figure 12:
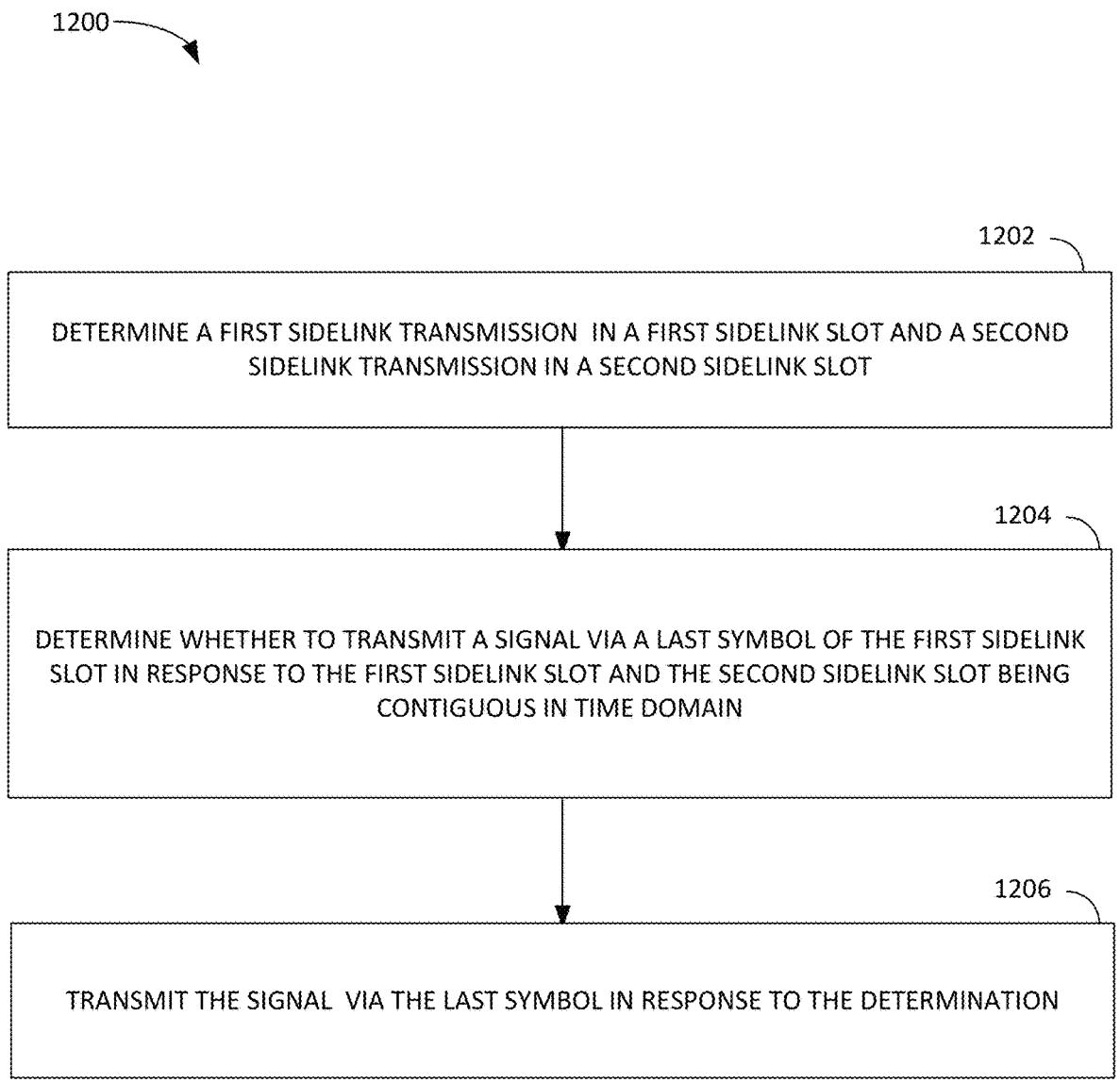
FIG. 12 is a flow diagram illustrating example operations for wireless communication, in accordance with certain aspects of the present disclosure.

FIG. 12 is a flow diagram illustrating example operations 1200 for wireless communication, in accordance with certain aspects of the present disclosure. The operations 1200 may be performed, for example, by a wireless node (e.g., UE 120).

At block 1202, the wireless node determines a first sidelink transmission in a first sidelink slot and a second sidelink transmission in a second sidelink slot. At block 1204, the wireless node determines whether to transmit a signal via a last symbol of the first sidelink slot or whether to use the last symbol of the first sidelink slot in response to the first sidelink slot and the second sidelink slot being contiguous in time domain. For example, as shown in FIG. 11, slots n and n+1 are contiguous in time. The first sidelink slot and the second sidelink slot may be determined to be contiguous in response to a first slot index/order of the first sidelink slot and a second slot index of the second sidelink slot being contiguous or adjacent (e.g., increment by 1). For example, the first sidelink slot and the second sidelink slot are consecutive in response to no slot/symbol/gap in between the first sidelink slot and the second sidelink slot. For instance, a 10 msec frame may be divided into a plurality of slots where the slot index may start from the earliest slot and increment by 1 for each adjacent slot. The signal is a reference signal, dummy data, or repetition of the first sidelink transmission or a subset of the first TB At block 1206, the wireless node transmits the signal via the last symbol of the first sidelink slot in response to the determination. The last symbol may be a $12^{th}$ symbol (e.g., where the first slot has 12 symbols or extended CP is used) or a $14^{th}$ symbol (e.g., where the first slot has 14 symbols or normal CP is used) of the first sidelink slot.

Figure 13:
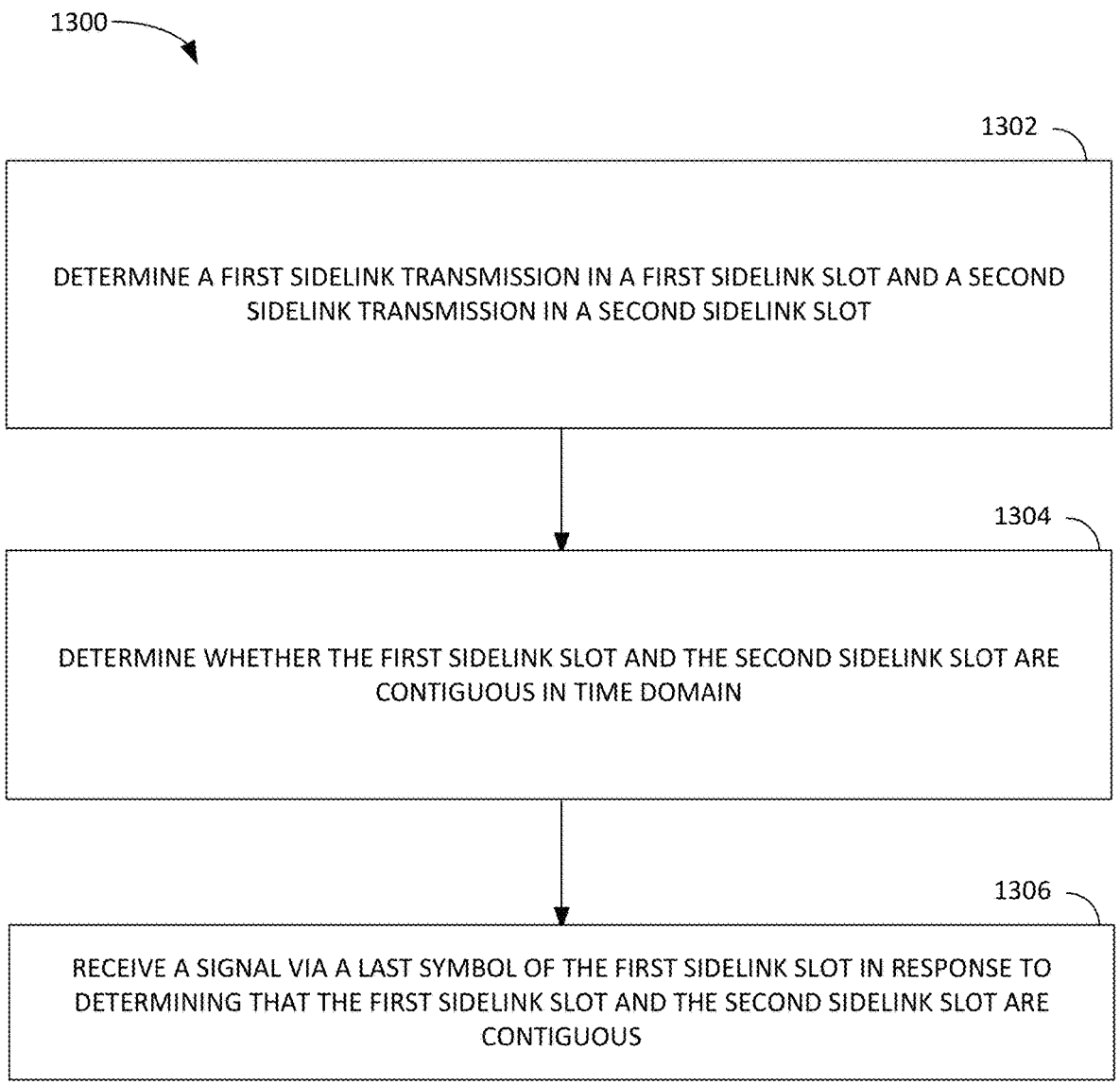
FIG. 13 is a flow diagram illustrating example operations for wireless communication, in accordance with certain aspects of the present disclosure.

FIG. 13 is a flow diagram illustrating example operations 1300 for wireless communication, in accordance with certain aspects of the present disclosure. The operations 1300 may be performed, for example, by a wireless node (e.g., UE 122).

At block 1302, the wireless device may determine a first sidelink transmission in a first sidelink slot and a second sidelink transmission in a second sidelink slot. At block 1304, the wireless device determines whether the first sidelink slot and the second sidelink slot are contiguous in time domain. The wireless device receives sidelink control information (SCI) associated with the first sidelink transmission. The SCI may indicate whether there is the second sidelink transmission in the second sidelink slot or not. Based on the SCI, the wireless device may determine whether there is the second sidelink transmission in the second sidelink slot. Then, the wireless device may determine whether the first sidelink slot and the second sidelink slot are contiguous or adjacent. The wireless device may determine this based on the SCI of the first sidelink transmission or based on the first sidelink transmission. The first sidelink slot and the second sidelink slot may be determined to be contiguous in response to a first slot index of the first sidelink slot and a second slot index of the second sidelink slot being contiguous or adjacent.

At block 1306, the wireless device receives a signal via a last symbol of the first sidelink slot in response to determining that the first sidelink slot and the second sidelink slot are contiguous. The signal may be a reference signal, dummy data, or repetition of the first sidelink transmission or a subset of a first TB of the first sidelink transmission.

Certain aspects are directed toward techniques for postponing sidelink transmission in response to an LBT failure. In some aspects, a wireless device may perform LBT before a sidelink transmission at a sidelink slot n. When LBT fails, the wireless device may determine whether to postpone or drop the sidelink transmission based on one or more conditions. For example, the one or more conditions may comprise one or more of the following. The wireless device may decide whether to postpone based on configuration. A base station or an AP or a second wireless device may configure the wireless device to drop or postpone the sidelink transmission in case of LBT failure. The wireless device may be preconfigured with either drop or postpone behavior in case of LBT failure.

The wireless device may decide whether to postpone based on a next slot of the slot n: when the next slot is a sidelink slot and the wireless device has not selected the next slot for another sidelink transmission, the wireless device may postpone. Otherwise, the wireless device may drop. When the next slot is a sidelink slot, the wireless device has not selected the next slot for another sidelink transmission and the wireless device has not received any SCI indicating the next slot is reserved/allocated by another wireless device, the wireless device may postpone the transmission. Otherwise, the wireless device may drop the transmission.

In some aspects, the wireless device may decide whether to postpone based on a priority value of a transport block of the sidelink transmission. When the priority value of the transport block is lower than or equal to a threshold (e.g., 2, lower priority value indicates higher priority) (or higher than or equal to a threshold when lower priority value indicates lower priority), the wireless device may postpone the transmission. Otherwise, the wireless device may drop the sidelink transmission. Any combination of one or more of the described conditions may be used to decide whether to postpone a transmission.

When the wireless device postpones the sidelink transmission, the wireless device may indicate a delay (K) between the sidelink slot n and a second sidelink slot n+K in the SCI so other wireless devices know the delay and may determine a reservation periodicity accordingly. K may indicate an actual number of slots between slot n and n+K regardless of a sidelink resource pool or regardless of the sidelink slot index.

Release 16 of the 3GPP standard defines two modes (modes 1 and 2) sidelink operation for the selection of sub-channels/resources in NR V2X sidelink (SL) communications using the NR V2X PC5 interface. These two modes are the counterparts to modes 3 and 4 in LTE V2X. However, LTE V2X only supports broadcast SL communications while NR V2X supports broadcast, groupcast, and unicast SL communications.

For mode 1, similar to mode 3 in LTE V2X, the gNB or eNB assigns and manages the SL radio resources for V2V communications under mode 1 using the NR (or LTE) Uu interface. UEs may therefore be in network coverage to operate using mode 1. SL radio resources can be allocated from licensed carriers dedicated to SL communications or from licensed carriers that share resources between SL and UL communications. The SL radio resources can be configured so that mode 1 and mode 2 use separate resource pools.

The alternative is that mode 1 and mode 2 share the resource pool. Pool sharing can result in a more efficient use of the resources, but it is prone to potential collisions between mode 1 and mode 2 transmissions. To solve this, mode 1 UEs notify mode 2 UEs of the resources allocated for future transmissions. Mode 1 uses dynamic grant (DG) scheduling like LTE V2X mode 3, but replaces the semi-persistent scheduling in LTE V2X mode 3 with a configured grant scheduling. With DG, mode 1 UEs request resources to the base station for the transmission of every single TB (and possible blind or HARQ retransmissions). To this aim, the UEs may send a Scheduling Request (SR) to the gNB using the PUCCH, and the gNB responds with the DCI over the PDCCH. The DCI indicates the SL resources (e.g., the slot(s) and sub-channel(s)) allocated for the transmission of a TB and up to 2 possible retransmissions of this TB.

The UE informs other UEs about the resources the UE will use to transmit a TB and up to 2 possible retransmissions using the 1st-stage SCI. Nearby UEs operating under mode 2 may then know which resources UEs in mode 1 will use. Requesting resources for each TB increases the delay. Mode 1 comprises the configured grant scheduling option to reduce the delay by pre-allocating SL radio resources. With this scheme, the gNB may assign a set of SL resources to a UE for transmitting several TBs. This set is referred to as a configured grant (CG). The UE first sends a message with UE assistance information to the gNB indicating information about the expected SL traffic including periodicity of TBs, TB maximum size and QoS information. The QoS information comprises KPIs such as the latency and reliability required by the TBs and their priority. The gNB uses this information to create, configure and allocate a CG to the UE that satisfies the requirements of the SL traffic. The CG is configured using a set of parameters that comprises the CG index, the time-frequency allocation and the periodicity of the allocated SL resources.

Figure 14:
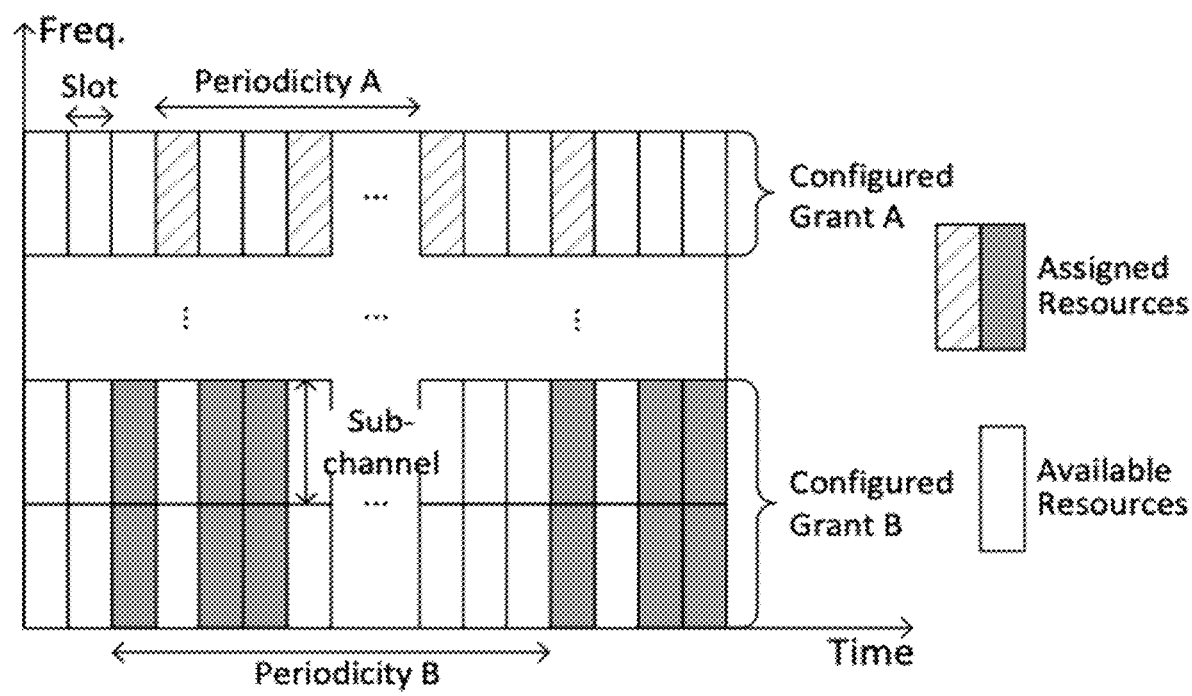
FIG. 14 shows two examples of configured grants, in accordance with certain aspects of the present disclosure.

FIG. 14 shows two examples of configured CGs. The two CGs have different periodicities and different time-frequency allocations. The time-frequency allocation indicates the slot(s) and subchannel(s) that are assigned periodically to the UE in a CG. A UE can be assigned a maximum of 3 SL resources during each period of the CG. The UE informs other vehicles of the resources allocated by the gNB for a particular CG period using the 1st-stage SCI. The UE can decide how to use the SL resources of an assigned CG. However, it can only transmit one new TB in each CG period. The SL resources of a CG period can also be used to retransmit the new TB transmitted in this CG, or to retransmit other TBs initially transmitted in previous CG periods. The maximum number of retransmissions per TB in a CG is associated with the priority of the TB. HARQ retransmissions in a CG are only possible if the resource pool of the CG has a PSFCH configured by the gNB (see Section v). It should be noted that a gNB can assign multiple SL CGs to a UE. The configuration of each CG can be adapted to the characteristics or demands of different V2X applications. However, the transmission and retransmissions of a TB must always utilize the resources of a single CG. Mode 1 defines two types of CG schemes for SL: CG type 1 and CG type 2. Both are configured using Radio Resource Control (RRC) signaling. CG type 1 can be used by the UE immediately until it is released by the base station (also using RRC signaling). SL CG type 2 can be used only after it is activated by the gNB and until it is deactivated. To this aim, the gNB notifies of the activation and deactivation using DCI signaling. The DCI also comprises the CG index and time-frequency allocation of CG type 2. CG type 2 can configure multiple CGs for a UE and only activate a subset of the CGs based on the UE needs. Resources in non-active CGs can be allocated to other UEs. CG type 1 can also configure multiples CGs. However, it forces UEs to activate CGs at the time of their configuration. CG type 1 reduces the signaling and the time needed to initiate a transmission compared to CG type 2. However, if any of the CGs type 1 are not used by the UE, the resources cannot be allocated to other UEs.

Figure 15:
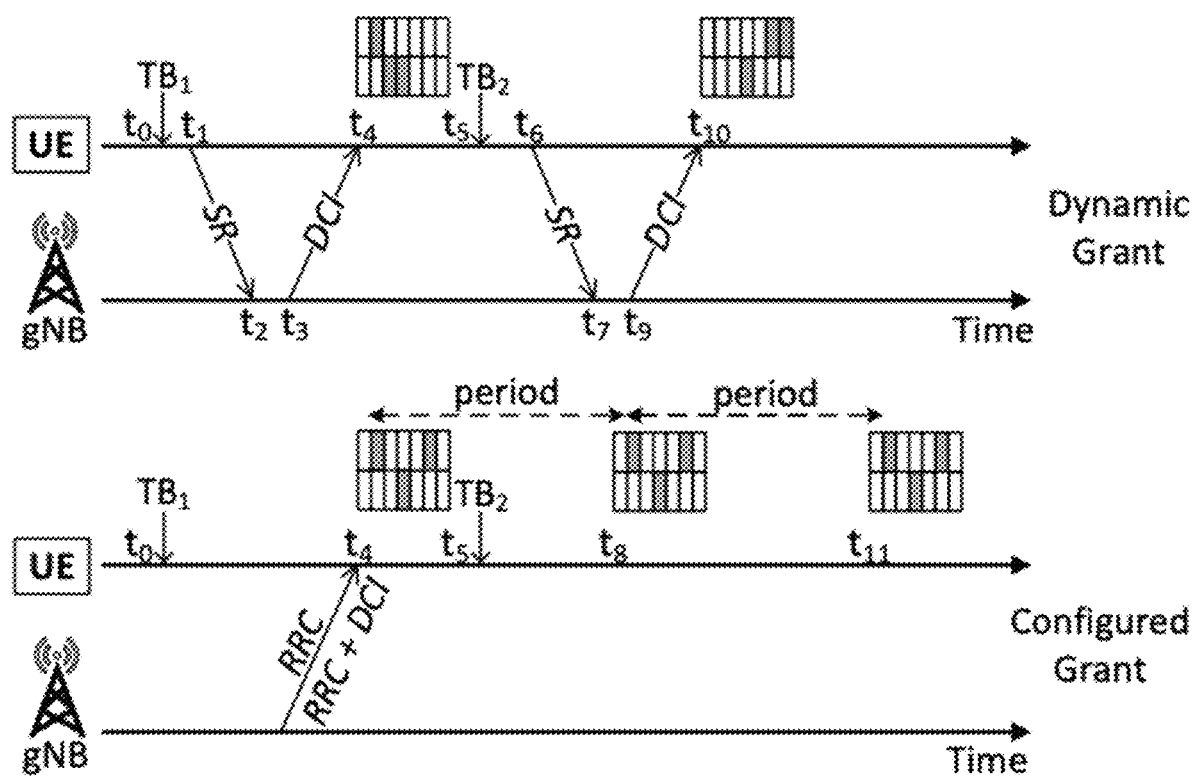
FIG. 15 shows example techniques for transmissions using dynamic and configured grants, in accordance with certain aspects of the present disclosure.

FIG. 15 shows an example that compares how transmissions are organized and scheduled when utilizing the DG and CG schemes to transmit two TBs (TB1 generated at t0 and TB2 generated at t5). With respect to the DG scheme, the UE sends an SR at t1 to request resources for transmitting TB1. The gNB responds with a DCI at t3, indicating the resources the user can utilize at t4. The same process takes place starting at t5 when TB2 is generated. TB2 can be transmitted using the next set of resources allocated at t10. For CG, the UE does not request resources but waits until the gNB grants it a CG. We suppose the UE receives the granted CG at t4. This CG comprises a set of resources assigned periodically to the UE at t4, 18 and t11. The time period is adjusted to the time between TBs indicated by the UE in the provided UE assistance information. The UE uses the resources at t4 to transmit TB1 and the resources at t8 to transmit TB2. The CG scheme reduces the time needed to transmit the two TBs compared to DG. However, the DG scheme can utilize resources more efficiently when handling non-periodic traffic since resources are only allocated when needed to transmit TBs.

Mode 1 defines three different MCS tables used to determine a TB's MCS. There are different ways to determine the MCS of a TB. The gNB can configure a UE to use one or more MCSs. In the latter case, the UE autonomously selects the MCS. The gNB can also configure a UE to use one, two or three of MCS tables. In this case, the UE again autonomously selects the MCS from the configured tables. The UE indicates the selected MCS and MCS table (when applicable) for a TB in the associated 1st-stage SCI. In mode 1, the gNB can enable HARQ retransmissions for groupcast and unicast communications. In this case, a RX UE can use a PSFCH associated with a received PSSCH to send HARQ feedback). The TX UE can inform the gNB about the feedback received from RX UEs with a feedback report. The gNB configures a PUCCH for the TX UE to send the feedback report. This feedback report in the PUCCH assists the gNB in the allocation of SL resources. The feedback report informs whether or not the SL transmissions of the last allocated SL resources were successful. Therefore, it is transmitted in the PUCCH configured after the PSFCH associated with the last allocated resource in the case of DG. For the case of the CG, the feedback report is transmitted in the PUCCH configured after the PSFCH associated with the last resource allocated for each CG period. It should be noted that the feedback report uses a single bit of the PUCCH to inform the gNB about the success of the potentially last three SL transmissions (both for DG, or a CG period). When the feedback report comprises information of the transmission and retransmissions of the same TB, the TX UE reports an ACK in the PUCCH only if all RX UEs receive correctly at least one of the (re) transmissions and they positively acknowledge it to the TX UE. Otherwise, the TX UE reports a NACK in the PUCCH. When the feedback report comprises information on the transmission and retransmissions of different TBs, the TX UE only reports an ACK if all RX UEs correctly receive the different TBs and positively acknowledge them to the TX UE. After receiving the feedback report, the gNB evaluates if it has to allocate new SL resources to the TX UE for additional HARQ retransmissions.

DCI format 3_0 is used for scheduling of NR PSCCH and NR PSSCH in one cell. The following information may be transmitted by means of the DCI format 3_0 with CRC scrambled by SL-RNTI or SL-CS-RNTI. The information transmitted may comprise resource pool index-$\lceil \log_2 I \rceil$ bits, where I is the number of resource pools for transmission configured by the higher layer parameter sl-TxPoolScheduling. The information transmitted may also comprise a time gap—3 bits determined by higher layer parameter sl-DCI-ToSL-Trans. The information may also comprise HARQ process number—4 bits, new data indicator—1 bit, lowest index of the subchannel allocation to the initial transmission $-\lceil \log_2 (N_{subChannel}^{SL}) \rceil$ bits. SCI format 1-A fields (e.g., frequency resource assignment, and time resource assignment). The information transmitted may also comprise PSFCH-to-HARQ feedback timing indicator $-\lceil \log_2 N_{fb\_timing} \rceil$ bits, where $N_{fb\_timing}$ is the number of entries in the higher layer parameter sl-PSFCH-ToPUCCH. The information transmitted may comprise PUCCH resource indicator-3 bits and configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI. The information may also comprise counter sidelink assignment index-2 bits and padding bits.

If multiple transmit resource pools are provided in sl-TxPoolScheduling, zeros may be appended to the DCI format 3_0 until the payload size is equal to the size of a DCI format 3_0 given by a configuration of the transmit resource pool resulting in the largest number of information bits for DCI format 3_0. If the UE is configured to monitor DCI format 3_1 and the number of information bits in DCI format 3_0 is less than the payload of DCI format 3_1, zeros may be appended to DCI format 3_0 until the payload size equals that of DCI format 3_1.

DCI format 3_1 is used for scheduling of LTE PSCCH and LTE PSSCH in one cell. The following information is transmitted by means of the DCI format 3_1 with CRC scrambled by SL Semi-Persistent Scheduling V-RNTI. The information may comprise timing offset, carrier indicator, lowest index of the subchannel allocation to the initial transmission $-\lceil \log_2 (N_{subchannel}^{SL}) \rceil$ bits, frequency resource location of initial transmission and retransmission, time gap between initial transmission and retransmission, SL index, SL SPS configuration index, and activation/release indication. If the UE is configured to monitor DCI format 3_0 and the number of information bits in DCI format 3_1 is less than the payload of DCI format 3_0, zeros may be appended to DCI format 3_1 until the payload size equals that of DCI format 3_0.

In some aspects of the present disclosure, when a wireless device operates a sidelink in a first carrier, the wireless device may be connected (e.g., RRC_CONNECTED) to a base station via one or more second carriers. The one or more second carriers may comprise the first carrier or may not comprise the first carrier. The base station may transmit one or more configuration parameters to the wireless device, wherein the one or more configuration parameters indicate a mode 1 resource allocation for the first carrier or a sidelink bandwidth part (BWP) of the first carrier. The wireless device may transmit one or more sidelink transmissions based on resources scheduled by the base station with the mode 1 resource allocation or mode 1 sidelink operation.

When the base station operates on an unlicensed spectrum, the base station may be able to reserve a channel occupancy time (COT) and may indicate the COT duration via a group common downlink control information (DCI) and/or a second wireless device may determine the COT duration based on received one or more DCIs. During a COT duration initiated by the base station, the second wireless device may be allowed to operate based on a channel access type 2 (or a LBT Cat 2) that may not require a backoff mechanism and may allow transmission after sensing the channel. This may increase transmission opportunity and reliability of the transmission of an uplink transmission.

When the mode 1 is configured to the wireless device, the one or more second carriers where the wireless device is connected (e.g., one or more serving cells of the wireless device are via the one or more second carriers), the one or more second carriers may comprise the unlicensed spectrum. For example, a third carrier of the one or more second carriers may be an unlicensed spectrum for which a group common DCI may be configured to indicate a slot formation indicator and/or COT information. In the example, the third carrier is same as the first carrier (e.g., co-channel) or in a same frequency.

In another example, the one or more second carriers may not comprise the first carrier or a third carrier of downlink/uplink operation of the base station operating in a same frequency to the first carrier. In such a case, the wireless device may not be configured with a group common DCI for a COT indication in existing technologies.

Conventional implementations may have a few limitations/drawbacks. For example, existing technologies may not allow a wireless device to utilize, for a sidelink transmission, a COT initiated by a base station in some cases. In some cases, the wireless device is not connected to a downlink/uplink carrier in a same frequency to a sidelink carrier (or a sidelink BWP) where the sidelink transmission would occur. In some cases, a COT indication is not supported for a sidelink operation. In some cases, a DCI scheduling sidelink resources for one or more sidelink transmissions may not indicate information on channel access type and/or LBT type and/or COT information. Enhancements on a COT sharing initiated by a base station for a mode 1 sidelink operation may be important. For example, allowing the COT by sidelink operation would enhance quality of service of sidelink operation of a wireless device. This may also reduce unused channel/resources due to backoff operations. However, considerations on, for example, other wireless devices operating a sidelink in a same carrier based on non-mode 1 resource allocation and/or out-of-coverage of the base station may be achieved such that fair channel access between the wireless device and the other wireless devices may be addressed.

In certain aspects of the present disclosure, a base station may transmit, to a wireless device, one or more configuration parameters indicating slot format combinations per cell (e.g., a slot format indicator configuration) for a sidelink BWP of a sidelink carrier. For example, the sidelink BWP may be co-channel (e.g., same frequency) to a serving cell (ci) of the wireless device. For example, the wireless device may not be connected/associated with any serving cell that co-channel or same frequency to the sidelink BWP. When the sidelink BWP may not have, in the frequency domain, overlapping serving cell, the base station and the wireless device may determine a serving cell index (e.g., 15 or 31) of the sidelink BWP/sidelink carrier that is a largest serving cell index that may be assigned to the wireless device. In an example, the base station may indicate a serving cell index for the sidelink BWP/sidelink carrier. The sidelink BWP may be used interchangeably with the sidelink carrier.

In some aspects, the one or more configuration parameters may indicate one or more parameters of the slot format combinations per cell (e.g., IE SlotFormatCombinationsPer-Cell) including slot format combination id, slot formats, serving cell id (e.g., largest serving cell index), subcarrier spacing, position in DCI, and/or the like. This may be allowed when the wireless device is configured with the sidelink BWP operating in an unlicensed spectrum.

In some aspects, a slot format for the sidelink BWP may be configured when the wireless device is configured/activated with a serving cell operating in the same frequency with the sidelink BWP or overlaps with the sidelink BWP partially or fully in the frequency domain.

The one or more configuration parameters may comprise one or more parameters of a slot format indicator. For example, the one or more parameters may comprise SFI (slot format indicator) RNTI (radio network temporary identifier), DCI payload size (e.g., size of a group common DCI indicating SFI(s)), a list of slot format combinations, one or more frequency and/or time domain resources of SFI indicator granularity (e.g., one SFI value may correspond to one time/frequency domain resource), a list of COT duration per cell (channel occupancy duration per cell, e.g., co-DurationsPerCellToAddModList), parameter(s) of search space switching, and/or the like. A CO-DurationPerCell (e.g., COT duration) may comprise a serving cell ID, a position in DCI, a subcarrier spacing, a list of channel occupancy duration, and/or the like.

The base station may enable or disable a COT sharing with sidelink transmissions or not via implicit or explicit configuration. For example, when a mode 1 resource allocation is configured for a sidelink BWP where a wireless device is configured/activated with a serving cell overlapping with the sidelink BWP in the frequency domain, the wireless device may determine that the COT sharing is enabled for sidelink transmissions via the sidelink BWP. In one example, the base station may enable (or disable) the COT sharing via one or more configuration parameters. For example, the configuration parameters may indicate to enable the COT sharing via a slot format indicator (e.g., adding COTSharingForSidelink and setting COTSharingForSidelink=TRUE in SlotFormatIndicator IE), and/or via CO-DurationPerCell for the sidelink BWP or a serving cell overlapping with the sidelink BWP (e.g., adding COTSharingForSidelink and setting COTSharingForSidelink=TRUE in CO-DurationPerCell IE) and/or via slot format combinations per cell for the sidelink BWP or a serving cell overlapping with the sidelink BWP (e.g., adding COTSharingForSidelink and setting COTSharingForSidelink=TRUE in SlotFormatCombinationsPerCell IE).

The base station may indicate a channel access type and/or channel access priority via a DCI scheduling sidelink resources. For example, a joint indication of a channel access type and/or channel access priority may be given via ChannelAccess-CPext field. The field may be 2 bits indicating combinations of channel access type and CP extension (e.g., indicated as index T_"ext") as defined in table shown in FIG. 16A or as defined in table shown in FIG. 16B, if ChannelAccessMode-r16="semistatic" is provided, for operation in a cell with shared spectrum channel access; 0 bit otherwise.

FIG. 16A is a table showing channel access type and CP extension for DCI format 0_0 and DCI format 1_0. FIG. 16B is a table showing channel access type and CP extension if ChannelAccessMode-r16="semistatic." In an example, when an SFI for a sidelink BWP is configured to be transmitted via a group common DCI, a base station may configure CO-DurationPerCell for a cell of the sidelink BWP, at least when a wireless device of the sidelink BWP may not have activated/configured serving cell overlaps with the sidelink BWP in frequency domain. The cell may be configured with a serving cell index where the serving cell index is not assigned to any serving cell of the wireless device or a cell index of the cell may be determined as the largest value of the candidate serving cell index (e.g., 15 in case maximum 16 serving cells would be configured to a device or 32 in case maximum 32 serving cells would be configured to a device).

In one example, a wireless device may indicate a capability of a sidelink operation whether the wireless device would support a slot format indicator for a cell of a sidelink BWP in a frequency band. For example, a field referred to as supportSFIforSidelinkBWPwithoutServingCell may indicate whether the wireless device supports receiving group common DCIs indicating SFIs for a cell in a frequency band without configured with a serving cell in the frequency band or overlaps with a sidelink BWP in the frequency band. If the capability is not indicated by the wireless device, the base station may not enable a COT sharing for the wireless device in a sidelink BWP unless the base station configures/activates a serving cell overlaps with the sidelink BWP.

In an example, a wireless device may receive SFI(s) for a sidelink BWP for a COT sharing when the wireless device is activated/configured with a mode 1 resource allocation for the sidelink BWP and the sidelink BWP is in an unlicensed spectrum.

In an example, a base station may configure a serving cell to a wireless device wherein the serving cell overlaps with a sidelink BWP for COT sharing. The base station may not activate the serving cell or may disable measurement on the serving cell. As an example, the base station may transmit one or more parameters of the serving cell such as frequency, carrier bandwidth, subcarrier spacing, and/or the like. The base station may transmit one or more parameters of a bandwidth part of the serving cell that may be used to interpret a SFI of the serving cell.

As an example, a base station may enable or disable a COT sharing for a sidelink operation by configuring or not configuring a DCI field of a channel access (e.g., ChannelAccess-CPext), wherein the DCI field is used for a DCI scheduling resources for sidelink transmissions (e.g., DCI format 3_0 or DCI format 3_1). For example, in addition to SL-RNTI (sidelink-RNTI for a mode 1 resource allocation of a sidelink operation) or without SL-RNTI (e.g., implicitly determined), a presence of a DCI field of ChannelAccess-CPext may be indicated by the base station via a configuration parameter to the wireless device (e.g., PresenceChannelAccess-CPext may be indicated as TRUE or FALSE (or 1 or 0) in a SL-ScheduledConfig information element.

ChannelAccess-CPext may be 2 bits, if PresenceChannelAccess-CPext is enabled or set to 1, and indicates combinations of channel access type and CP extension as defined in table 1602, or table 1604 if ChannelAccessMode-r16="semistatic" is provided, for operation in a cell with shared spectrum channel access.

Figure 17:
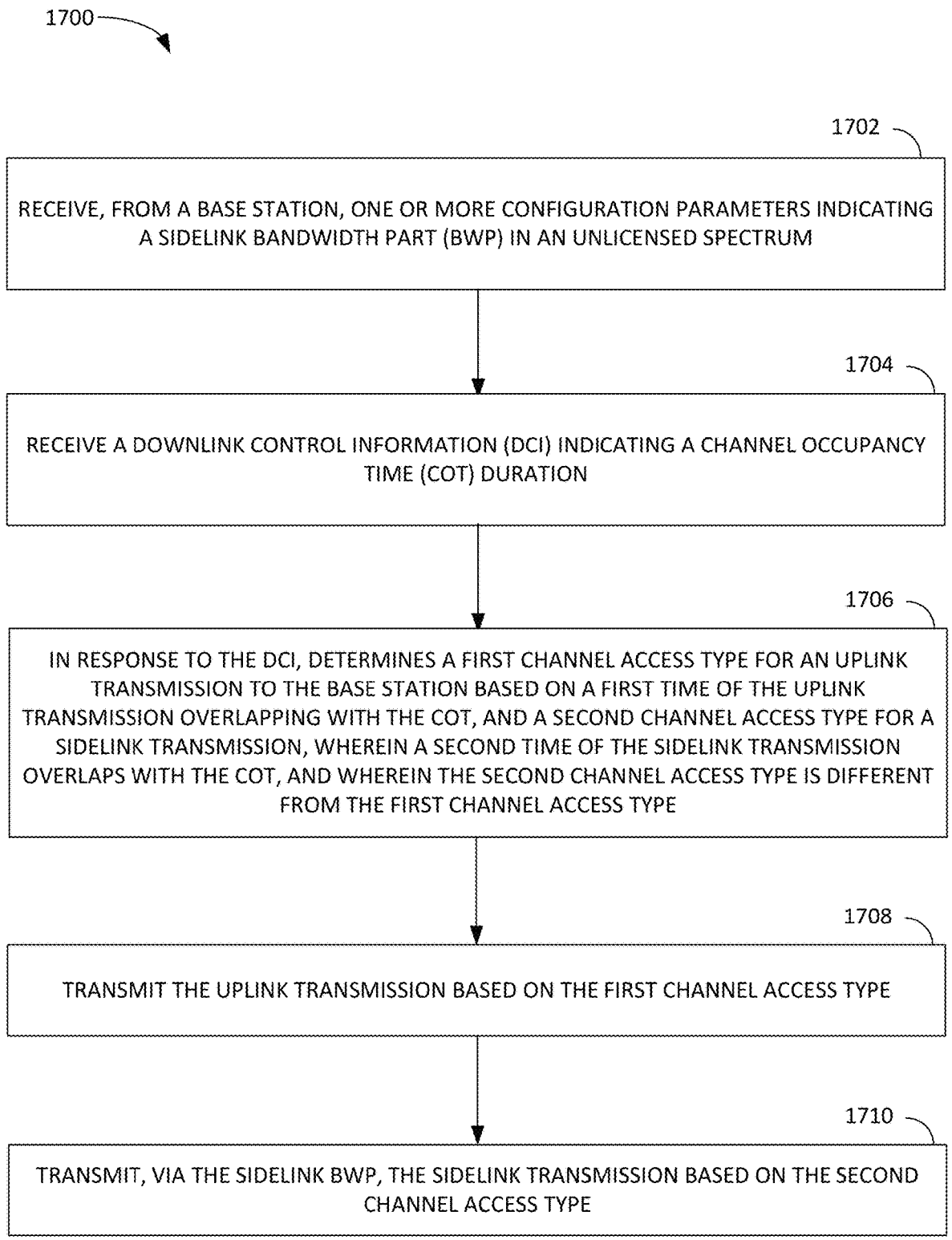
FIG. 17 is a flow diagram illustrating example operations for wireless communication, in accordance with certain aspects of the present disclosure.

FIG. 17 is a flow diagram illustrating example operations 1700 for wireless communication, in accordance with certain aspects of the present disclosure. The operations 1700 may be performed, for example, by a wireless node (e.g., UE 120).

At block 1702, the wireless device receives, from a base station (e.g., base station 124), one or more configuration parameters indicating a sidelink bandwidth part (BWP) in an unlicensed spectrum. At block 1704, the wireless device receives a downlink control information (DCI) indicating a channel occupancy time (COT) duration.

At block 1706, the wireless device, in response to the DCI, determines a first channel access type for an uplink transmission to the base station based on a first time of the uplink transmission overlapping with the COT, and a second channel access type for a sidelink transmission, wherein a second time of the sidelink transmission overlaps with the COT, and wherein the second channel access type is different from the first channel access type. In some aspects, the one or more configuration parameters further indicate a serving cell in the unlicensed spectrum. A frequency associated with the sidelink BWP may be the same as a frequency of the sidelink BWP.

At block 1708, the wireless device transmits the uplink transmission based on the first channel access type, and at block 1710, transmits, via the sidelink BWP, the sidelink transmission based on the second channel access type.

Figure 18:
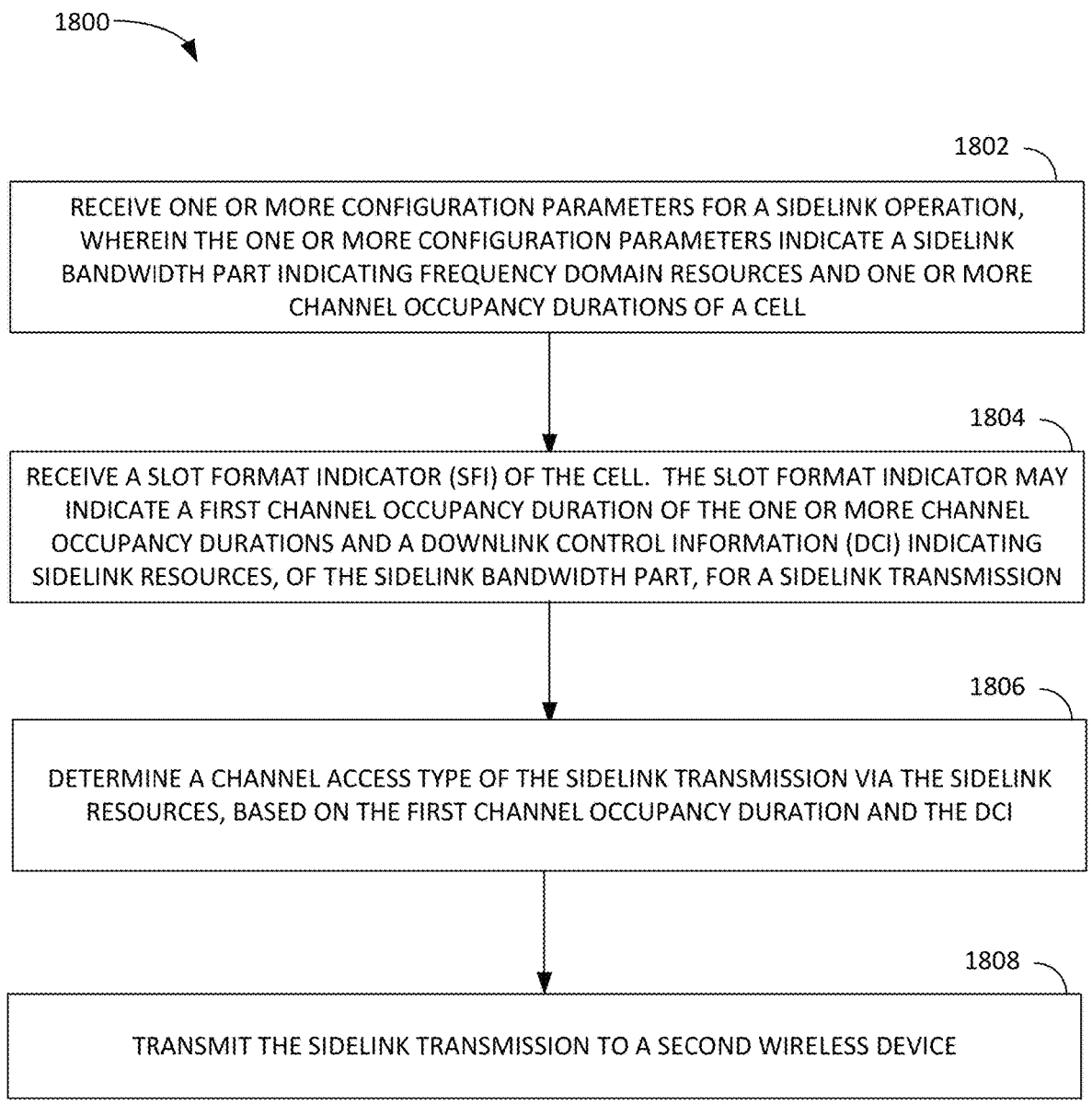
FIG. 18 is a flow diagram illustrating example operations for wireless communication, in accordance with certain aspects of the present disclosure.

FIG. 18 is a flow diagram illustrating example operations 1800 for wireless communication, in accordance with certain aspects of the present disclosure. The operations 1800 may be performed by a wireless device.

At block 1802, the wireless device receives one or more configuration parameters for a sidelink operation, wherein the one or more configuration parameters indicate a sidelink bandwidth part indicating frequency domain resources and one or more channel occupancy durations of a cell.

At block 1804, the wireless device receives a slot format indicator (SFI) of the cell. The slot format indicator may indicate a first channel occupancy duration of the one or more channel occupancy durations and a downlink control information (DCI) indicating sidelink resources, of the sidelink bandwidth part, for a sidelink transmission. In some aspects, the wireless node transmits, to a base station, an indication that the wireless device supports receiving the SFI of the cell.

In some aspects, the one or more configuration parameters further indicate one or more activated serving cells, where downlink or uplink operation occurs via the one or more activated serving cells, wherein the one or more activated serving cells is different than the cell, or a bandwidth part of the cell, wherein the bandwidth part overlaps in a frequency domain with the sidelink bandwidth part. In some aspects, the one or more configuration parameters comprise at least one of parameters of the sidelink bandwidth part (BWP), a serving cell index for the cell; a channel occupancy (CO) sharing for the sidelink BWP, or a radio network temporary identifier (RNTI) for receiving the DCI.

At block 1806, the wireless device determines a channel access type of the sidelink transmission via the sidelink resources, based on the first channel occupancy duration and the DCI, and at block 1808, transmits the sidelink transmission to a second wireless device. In some aspects, determining the channel access type comprises determining whether to use a contention window to perform a listen before talk.

In some aspects, the channel access type is determined based on whether the sidelink resources is overlapping, at least in time domain, with a remaining channel occupancy duration. The remaining channel occupancy duration may be determined based on the channel occupancy duration and a timing when the wireless device receives the SFI. For example, the remaining channel occupancy duration may be determined as a portion of the channel occupancy time indicated by the SFI from the timing of the SFI. For example, when the COT in SFI indicates 10 slots, and the wireless device receives the SFI in slot m, remaining channel occupancy duration is between slot m to slot m+10.

In some aspects, the channel access type may be determined based on whether the sidelink resources is overlapping, in frequency and time domain, with resources of a remaining channel occupancy duration. The remaining channel occupancy duration is determined based on the channel occupancy duration and a timing when the wireless device receives the SFI, as described herein.

In some aspects, the channel access type is determined based on whether the sidelink resources is overlapping, in spatial, frequency and time domain, with resources of a remaining channel occupancy duration. The remaining channel occupancy duration may be determined based on the channel occupancy duration and a timing when the wireless device receives the SFI.

Figure 19:
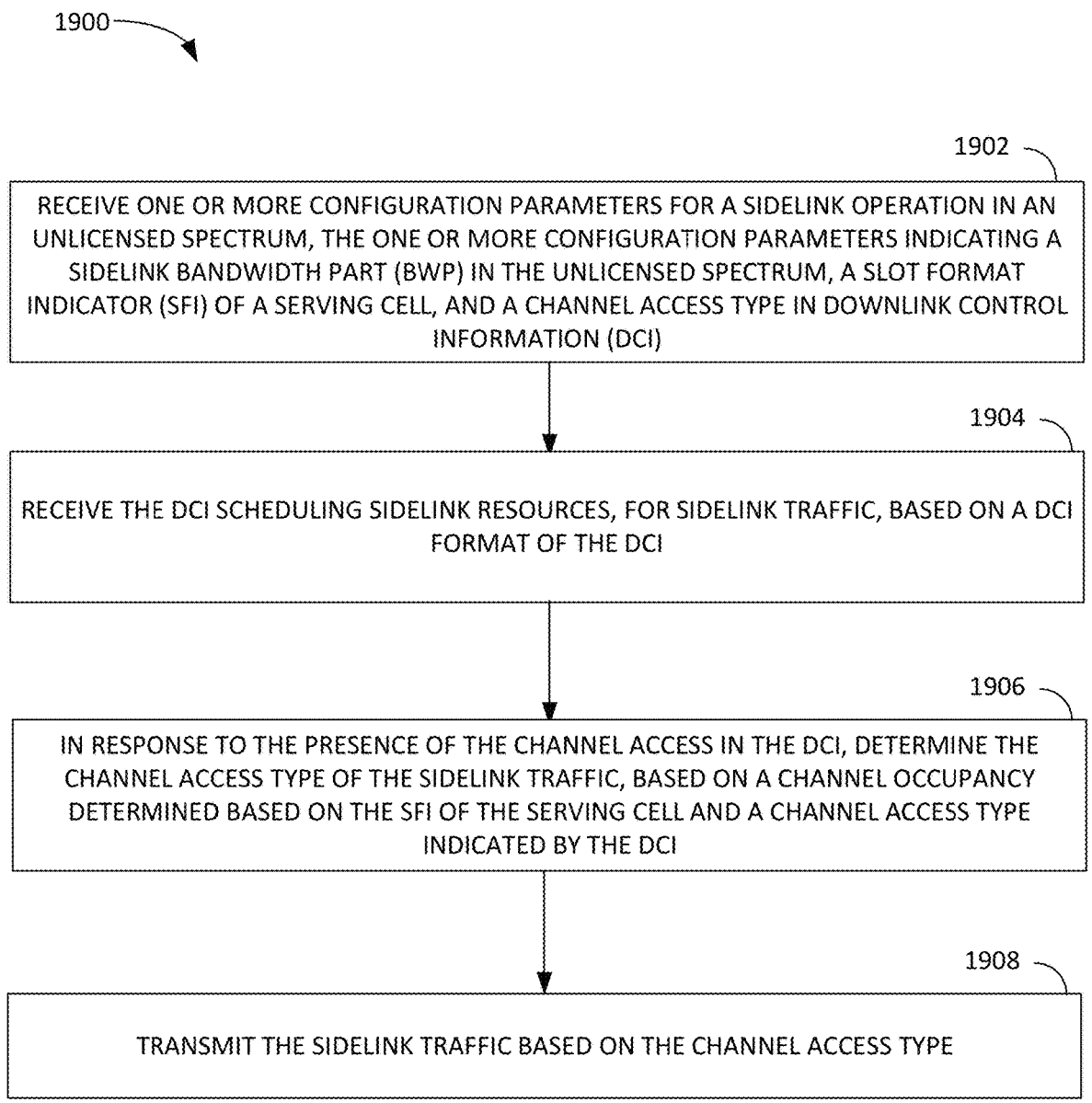
FIG. 19 is a flow diagram illustrating example operations for wireless communication, in accordance with certain aspects of the present disclosure.

FIG. 19 is a flow diagram illustrating example operations 1900 for wireless communication, in accordance with certain aspects of the present disclosure. The operations 1900 may be performed, for example, by a wireless node (e.g., UE 120).

At block 1902, the wireless device receives one or more configuration parameters for a sidelink operation in an unlicensed spectrum. The one or more configuration parameters may indicate a sidelink bandwidth part (BWP) in the unlicensed spectrum, a slot format indicator (SFI) of a serving cell, and a channel access type in downlink control information (DCI). The serving cell may overlap in frequency domain with the sidelink bandwidth part.

In some aspects, the one or more configuration parameters further indicate a sidelink radio network temporary identifier (SL-RNTI) for the DCI scheduling sidelink resources for the sidelink BWP.

At block 1904, the wireless device receives the DCI scheduling sidelink resources, for sidelink traffic, based on a DCI format of the DCI.

At block 1906, the wireless device, in response to the presence of the channel access in the DCI, determines the channel access type of the sidelink traffic, based on a channel occupancy determined based on the SFI of the serving cell and a channel access type indicated by the DCI.

At block 1908, the wireless device transmits the sidelink traffic based on the channel access type. In some aspects, determining channel access type may comprise determining whether the wireless device is to use a contention window for a listen before talk.

In some aspects, the channel access type is determined based on whether the sidelink resources is overlapping, at least in time domain, with a remaining channel occupancy duration. The remaining channel occupancy duration may be determined based on the SFI and a timing when the wireless device receives the SFI, as described.

In some aspects, the channel access type is determined based on whether the sidelink resources is overlapping, in frequency and time domain, with resources of a remaining channel occupancy duration. The remaining channel occupancy duration is determined based on the SFI and a timing when the wireless device receives the SFI.

In some aspects, the channel access type is determined based on whether the sidelink resources is overlapping, in spatial, frequency and time domain, with resources of a remaining channel occupancy duration. The remaining channel occupancy duration is determined based on the SFI and a timing when the wireless device receives the SFI.

In an example, a wireless device may receive a SFI indicating a COT for a Uu operation (e.g., for new radio-unlicensed (NR-U)) in an unlicensed spectrum. The wireless device may operate sidelink in the unlicensed spectrum. The wireless device may determine one or more sidelink resources for one or more sidelink transmissions overlapping with the COT. The wireless device may drop the one or more sidelink transmissions in response to the one or more sidelink resources overlapping with the COT. The wireless device may transmit the one or more sidelink transmissions during the COT in response to the one or more sidelink resources overlapping with uplink resources indicated by the SFI.

Figure 20:
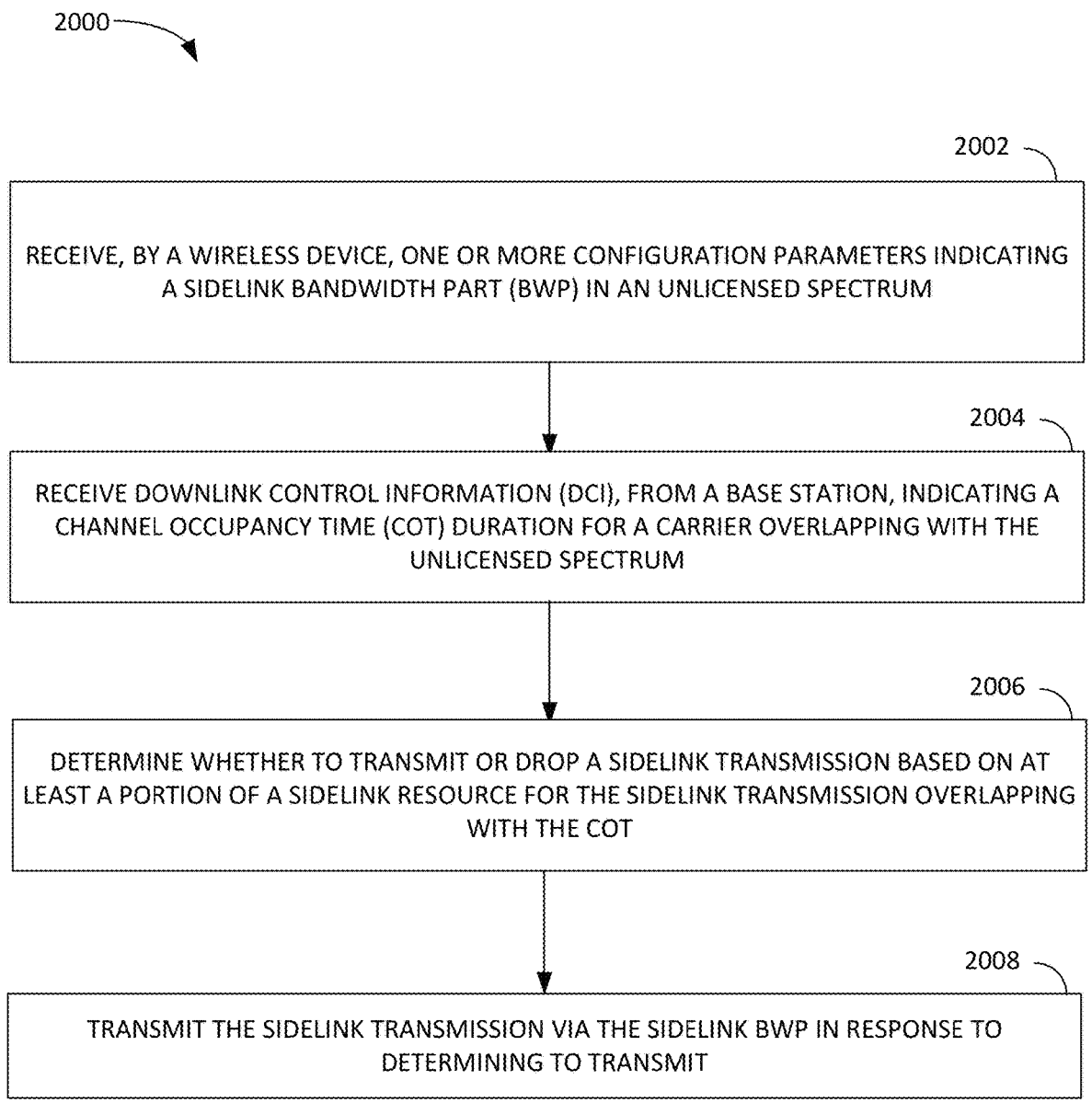
FIG. 20 is a flow diagram illustrating example operations for wireless communication, in accordance with certain aspects of the present disclosure.

FIG. 20 is a flow diagram illustrating example operations 2000 for wireless communication, in accordance with certain aspects of the present disclosure. The operations 2000 may be performed, for example, by a wireless node (e.g., UE 120).

At block 2002, the wireless device receives one or more configuration parameters indicating a sidelink bandwidth part (BWP) in an unlicensed spectrum.

At block 2004, the wireless device receives downlink control information (DCI), from a base station, indicating a channel occupancy time (COT) duration for a carrier overlapping with the unlicensed spectrum.

At block 2006, the wireless device determines whether to transmit or drop a sidelink transmission based on at least a portion of a sidelink resource for the sidelink transmission overlapping with the COT. The sidelink transmission may be determined to be dropped in response to the second time of the sidelink resource overlapping with the COT. The sidelink transmission may be determined to be dropped in response to the time of the sidelink resource overlapping with the COT and failure of listen before talk performed based on a channel access type.

The sidelink transmission may be determined to be transmitted in response to the sidelink resource being non-overlapping with the COT, and success of listen before talk performed based on a first channel access type. The wireless device may determine to transmit an uplink transmission to the base station in response to: at least a portion of the uplink transmission overlapping with the COT; and success of listen before talk performed based on a second channel access type, the first channel access type being different than the second channel access type. The wireless device may transmit the uplink transmission. At block 2008, the wireless device transmits the sidelink transmission via the sidelink BWP in response to determining to transmit.

In an example, a wireless device may receive a SFI indicating a COT for a Uu operation (e.g., for NR-U) in an unlicensed spectrum. The wireless device may operate sidelink in the unlicensed spectrum. The wireless device may determine one or more sidelink resources for one or more sidelink transmissions overlapping with the COT. The wireless device may receive an uplink grant of an uplink transmission during the COT. The wireless device may determine a first LBT type for the uplink transmission in response to the COT and/or resources of the uplink transmission overlapping with the COT. The wireless device may determine a second LBT type for the one or more sidelink transmissions. For example, the first LBT type may be LBT type 1 or type 2. For example, the second LBT type may be LBT type 4.

Figure 21:
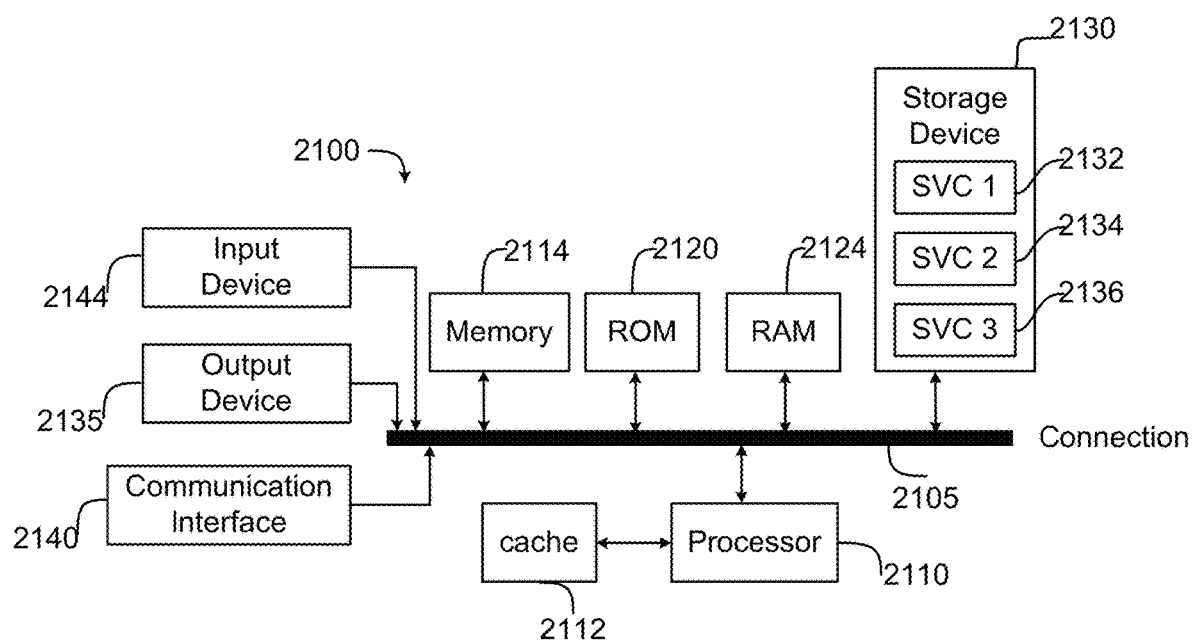
FIG. 21 illustrates an architecture of a computing system, in accordance with certain aspects of the present disclosure.

FIG. 21 illustrates an architecture of a computing system 2100 wherein the components of the system 2100 are in electrical communication with each other using a connection 2105, such as a bus. Exemplary system 2100 comprises a processing unit (CPU or processor) 2110 and a system connection 2105 that couples various system components including the system memory 2114, such as read only memory (ROM) 2120 and random access memory (RAM) 2124, to the processor 2110. The system 2100 can comprise a cache of high-speed memory connected directly with, in close proximity to, or integrated as part of the processor 2110. The system 2100 can copy data from the memory 2114 and/or the storage device 2130 to the cache 2112 for quick access by the processor 2110. In this way, the cache can provide a performance boost that avoids processor 2110 delays while waiting for data. These and other modules can control or be configured to control the processor 2110 to perform various actions. Other system memory 2114 may be available for use as well. The memory 2114 can comprise multiple different types of memory with different performance characteristics. The processor 2110 can comprise any general purpose processor and a hardware or software service, such as service 1 2132, service 2 2134, and service 3 2136 stored in storage device 2130, configured to control the processor 2110 as well as a special-purpose processor where software instructions are incorporated into the actual processor design. The processor 2110 may be a completely self-contained computing system, containing multiple cores or processors, a bus, memory controller, cache, etc. A multi-core processor may be symmetric or asymmetric.

To enable client interaction with the computing system 2100, an input device 2144 can represent any number of input mechanisms, such as a microphone for speech, a touch-sensitive screen for gesture or graphical input, keyboard, mouse, motion input, speech and so forth. An output device 2135 can also be one or more of a number of output mechanisms known to those of skill in the art. In some instances, multimodal systems can enable a client to provide multiple types of input to communicate with the computing system 2100. The communications interface 2140 can generally govern and manage the client input and system output. There is no restriction on operating on any particular hardware arrangement and therefore the basic features here may easily be substituted for improved hardware or firmware arrangements as they are developed. In some aspects, the communications interface may comprise a transceiver and at least one antenna, facilitating transmission and reception of data. The computing system 2100 may be implemented as part of a wireless device or network component (e.g., base station).

Storage device 2130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2124, read only memory (ROM) 2120, and hybrids thereof.

The storage device 2130 can comprise services 2132, 2134, 2136 for controlling the processor 2110. Other hardware or software modules are contemplated. The storage device 2130 can be connected to the system connection 2105. In one aspect, a hardware module that performs a particular function can comprise the software component stored in a computer-readable medium in connection with the necessary hardware components, such as the processor 2110, connection 2105, output device 2135, and so forth, to carry out the function.

It is to be understood that the specific order or hierarchy of steps in the method(s) discussed and/or depicted throughout this disclosure are instances of example approaches and can be rearranged while remaining within the disclosed subject matter. For instance, any of the operations discussed and/or depicted throughout this disclosure may be omitted, repeated, performed in parallel, performed in a different order, and/or combined with any other of the operations discussed and/or depicted and throughout this disclosure.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined differently in various implementations of the disclosure or described with different terminology. These and other variations, modifications, additions, and improvements may fall within the scope of the disclosure as defined in the claims that follow.

Example Clauses

Clause 1. A method for wireless communication, comprising: identifying, by a wireless device, a frequency of a sidelink operation being unlicensed spectrum; detecting whether a synchronization signal is on one or more carriers overlapping with the frequency; in response to the detection, determining whether to enable the sidelink operation in the frequency; and sending an indication of whether the sidelink operation is enabled based on the determination.

Clause 2. The method of clause 1, wherein determining whether to enable the sidelink operation comprises determining to disable the sidelink operation in response to detecting that the synchronization signal is on the one or more carriers.

Clause 3. The method of clause 1, wherein determining whether to enable the sidelink operation comprises determining to enable the sidelink operation in response to detecting that the synchronization signal is absent on the one or more carriers.

Clause 4. The method of clause 3, further comprising communicating sidelink traffic via the frequency in response to the sidelink operation being enabled.

Clause 5. The method of clause 1, wherein indication of whether the sidelink operation is enabled is sent to a higher layer of the wireless device.

Clause 6. A method for wireless communication, comprising: receiving, by a wireless device, one or more messages indicating one or more frequency configurations, where each of the one or more frequency configurations comprises a sidelink bandwidth part, and condition information, the condition information indicating whether one or more conditions are to be applied to enable a sidelink operation via the sidelink bandwidth part; and determining whether to perform the sidelink operation via the sidelink bandwidth part based on the condition information.

Clause 7. The method of clause 6, wherein each of the one or more of frequency configurations also indicates a frequency band, the sidelink bandwidth part being in the frequency band.

Clause 8. The method of clause 6, wherein the condition information indicates a condition for enabling the sidelink operation, the method further comprising communicating sidelink traffic based on the condition being met.

Clause 9. The method of clause 6, wherein the one or more conditions comprise at least one of: a location associated with the wireless device; a zone associated with the wireless device; a busy ratio associated with the sidelink bandwidth part meeting a busy ratio threshold; one or more channel occupancy times associated with the sidelink bandwidth part meeting a channel occupancy time threshold; a presence or absence of a base station communicable with the wireless device; or a presence or absence of a wireless access point communicable with the wireless device.

Clause 10. The method of clause 6, wherein the one or more frequency configurations indicate one or more frequencies within an unlicensed spectrum.

Clause 11. The method of clause 6, wherein the one or more frequency configurations indicate one or more frequencies with a licensed spectrum.

Clause 12. The method of clause 6, wherein the one or more frequency configurations indicate one or more frequencies with a shared spectrum.

Clause 13. A method for wireless communication, comprising: transmitting, by a wireless device, a first sidelink transmission of a first transport block in a first slot; determining a listen before talk category for a second sidelink transmission based on: a duration between a latest symbol of the first sidelink transmission and an earliest symbol of the second sidelink transmission; whether the first transport block is the same as the second transport block; or whether a sidelink feedback resource is allocated in the first slot; and transmitting, by the wireless device, the second sidelink transmission of a second transport block in a second slot based on the determination.

Clause 14. The method of clause 13, further comprising performing listen before talk for the second sidelink transmission in accordance with the listen before talk category, wherein the second sidelink transmission is transmitted in response to success of the listen before talk.

Clause 15. The method of clause 13, wherein the listen before talk category is one of category 2 LBT, category 4 LBT, or no LBT.

Clause 16. The method of clause 13, wherein the listen before talk category is category 2 LBT or no LBT based on at least one of: the duration being less than a time threshold or less than a number of symbols; or the first transport being the same as the second transport block.

Clause 17. The method of clause 13, wherein the listen before talk category is category 2 LBT or no LBT based on the sidelink feedback resource not being allocated in the first slot.

Clause 18. The method of clause 13, wherein the listen before talk category is category 4 LBT based on: the duration being greater than a time threshold or greater than a number of symbols; or the first transport being different than the second transport block.

Clause 19. The method of clause 13, wherein the listen before talk category is category 4 LBT based on the sidelink feedback resource being allocated in the first slot.

Clause 20. The method of clause 13, further comprising determining the latest symbol of the first sidelink transmission based on a sidelink feedback resource in the first slot, wherein the latest symbol is a last symbol including the sidelink feedback resource of the first slot.

Clause 21. The method of clause 20, further comprising determining the latest symbol of the first sidelink transmission as the last symbol including the sidelink feedback resource of the first slot in response to the sidelink feedback resource being present in the first slot.

Clause 22. A method for wireless communication, comprising: receiving, by a wireless device, a first sidelink transmission of a first transport block in a first slot; determining a listen before talk category for a second sidelink transmission based on at least one of: a duration between a latest symbol of the first sidelink transmission and an earliest symbol of a second sidelink transmission; whether the first transport block is the same as a second transport block including the second sidelink transmission; or whether a sidelink feedback resource is allocated in the first slot; and transmitting, by the wireless device, the second sidelink transmission of the second transport block in a second slot based on the determination.

Clause 23. The method of clause 22, further comprising performing listen before talk for the second sidelink transmission in accordance with the listen before talk category, wherein the second sidelink transmission is transmitted in response to success of the listen before talk.

Clause 24. The method of clause 22, wherein the listen before talk category is one of category 2 LBT, category 4 LBT, or no LBT.

Clause 25. The method of clause 22, wherein the listen before talk category is category 2 LBT or no LBT based on at least one of: the duration being less than a time threshold or less than a number of symbols; or the first transport being the same as the second transport block.

Clause 26. The method of clause 22, wherein the listen before talk category is category 2 LBT or no LBT based on the sidelink feedback resource not being allocated in the first slot.

Clause 27. The method of clause 22, wherein the listen before talk category is category 4 LBT based on: the duration being greater than a time threshold or greater than a number of symbols; or the first transport being different than the second transport block.

Clause 28. The method of clause 22, wherein the listen before talk category is category 4 LBT based on the sidelink feedback resource being allocated in the first slot.

Clause 29. The method of clause 22, further comprising determining the latest symbol of the first sidelink transmission based on a sidelink feedback resource in the first slot, wherein the latest symbol is a last symbol including the sidelink feedback resource of the first slot.

Clause 30. The method of clause 29, further comprising determining the latest symbol of the first sidelink transmission as the last symbol including the sidelink feedback resource of the first slot in response to the sidelink feedback resource being present in the first slot.

Clause 31. A method for wireless communication, comprising: determining, by a wireless device, a first sidelink transmission in a first slot and a second sidelink transmission in a second slot; determining whether to transmit a signal via a last symbol of the first slot in response to the first slot and the second slot being contiguous in time domain; and transmitting the signal via the last symbol in response to the determination.

Clause 32. The method of clause 31, wherein the first slot and the second slot are determined to be contiguous in response to a first slot index of the first slot and a second slot index of the second slot being contiguous or adjacent.

Clause 33. The method of clause 31, wherein the signal is a reference signal, dummy data, or repetition of the first sidelink transmission or a subset of a transport block, the first slot being in the first transport block.

Clause 34. The method of clause 31, wherein the last symbol is a 12th symbol or a 14th symbol of the first slot.

Clause 35. A method for wireless communication, comprising: determining, by a wireless device, a first sidelink transmission in a first slot and a second sidelink transmission in a second slot; determining whether the first slot and the second slot are contiguous in time domain; and receiving a signal via a last symbol of the first slot in response to determining that the first slot and the second slot are contiguous.

Clause 36. The method of clause 35, wherein the first slot and the second slot are determined to be contiguous in response to a first slot index of the first slot and a second slot index of the second slot being contiguous or adjacent.

Clause 37. The method of clause 35, wherein the signal is a reference signal, dummy data, or repetition of the first sidelink transmission or a subset of a transport block including the first slot.

Clause 38. The method of clause 35, wherein the last symbol is a 12th symbol or a 14th symbol of the slot.

Clause 39. A method for wireless communication, comprising: receiving, by a wireless device, one or more configuration parameters for a sidelink operation, wherein the one or more configuration parameters indicate a sidelink bandwidth part indicating frequency domain resources and one or more channel occupancy durations of a cell; receiving: a slot format indicator (SFI) of the cell, wherein the slot format indicator indicates a first channel occupancy duration of the one or more channel occupancy durations; and a downlink control information (DCI) indicating sidelink resources, of the sidelink bandwidth part, for a sidelink transmission; determining a channel access type of the sidelink transmission via the sidelink resources, based on the first channel occupancy duration and the DCI; and transmitting the sidelink transmission to a second wireless device.

Clause 40. The method of clause 39, wherein the one or more configuration parameters further indicate: one or more activated serving cells, where downlink or uplink operation occurs via the one or more activated serving cells, wherein the one or more activated serving cells is different than the cell; or a bandwidth part of the cell, wherein the bandwidth part overlaps in a frequency domain with the sidelink bandwidth part.

Clause 41. The method of clause 39, wherein the one or more configuration parameters comprise at least one of: parameters of the sidelink bandwidth part (BWP); a serving cell index for the cell; a channel occupancy (CO) sharing for the sidelink BWP; or a radio network temporary identifier (RNTI) for receiving the DCI.

Clause 42. The method of clause 39, further comprising transmitting, by the wireless device to a base station, an indication that the wireless device supports receiving the SFI of the cell.

Clause 43. The method of clause 39, wherein determining the channel access type comprises determining whether to use a contention window to perform a listen before talk.

Clause 44. The method of clause 39, wherein the channel access type is determined based on whether the sidelink resources is overlapping, at least in time domain, with a remaining channel occupancy duration, wherein the remaining channel occupancy duration is determined based on the channel occupancy duration and a timing when the wireless device receives the SFI.

Clause 45. The method of clause 39, wherein the channel access type is determined based on whether the sidelink resources is overlapping, in frequency and time domain, with resources of a remaining channel occupancy duration, wherein the remaining channel occupancy duration is determined based on the channel occupancy duration and a timing when the wireless device receives the SFI.

Clause 46. The method of clause 39, wherein the channel access type is determined based on whether the sidelink resources is overlapping, in spatial, frequency and time domain, with resources of a remaining channel occupancy duration, wherein the remaining channel occupancy duration is determined based on the channel occupancy duration and a timing when the wireless device receives the SFI.

Clause 47. A method for wireless communication, comprising: receiving, by a wireless device, one or more configuration parameters for a sidelink operation in an unlicensed spectrum, wherein the one or more configuration parameters indicate: a sidelink bandwidth part (BWP) in the unlicensed spectrum; a slot format indicator (SFI) of a serving cell, wherein the serving cell overlaps in frequency domain with the sidelink bandwidth part; and a channel access type in downlink control information (DCI); receiving the DCI scheduling sidelink resources, for sidelink traffic, based on a DCI format of the DCI; in response to a presence of the channel access in the DCI, determining the channel access type of the sidelink traffic, based on a channel occupancy determined based on the SFI of the serving cell and a channel access type indicated by the DCI; and transmitting the sidelink traffic based on the channel access type.

Clause 48. The method of clause 47, wherein the one or more configuration parameters further indicate a sidelink radio network temporary identifier (SL-RNTI) for the DCI scheduling sidelink resources for the sidelink BWP.

Clause 49. The method of clause 47, wherein determining channel access type comprises determining whether the wireless device is to use a contention window for a listen before talk.

Clause 50. The method of clause 47, wherein the channel access type is determined based on whether the sidelink resources is overlapping, at least in time domain, with a remaining channel occupancy duration, wherein the remaining channel occupancy duration is determined based on the SFI and a timing when the wireless device receives the SFI.

Clause 51. The method of clause 47, wherein the channel access type is determined based on whether the sidelink resources is overlapping, in frequency and time domain, with resources of a remaining channel occupancy duration, wherein the remaining channel occupancy duration is determined based on the SFI and a timing when the wireless device receives the SFI.

Clause 52. The method of clause 47, wherein the channel access type is determined based on whether the sidelink resources is overlapping, in spatial, frequency and time domain, with resources of a remaining channel occupancy duration, wherein the remaining channel occupancy duration is determined based on the SFI and a timing when the wireless device receives the SFI.

Clause 53. A method for wireless communication, comprising: receiving, by a wireless device, one or more configuration parameters indicating a sidelink bandwidth part (BWP) in an unlicensed spectrum; receiving downlink control information (DCI), from a base station, indicating a channel occupancy time (COT) duration for a carrier overlapping with the unlicensed spectrum; determining whether to transmit or drop a sidelink transmission at least based on at least a portion of a sidelink resource for the sidelink transmission overlapping with the COT; and transmitting the sidelink transmission via the sidelink BWP in response to determining to transmit.

Clause 54. The method of clause 53, wherein the sidelink transmission is determined to be dropped in response to the second time of the sidelink resource overlapping with the COT.

Clause 55. The method of clause 53, wherein the sidelink transmission is determined to be dropped in response to the time of the sidelink resource overlapping with the COT and failure of listen before talk performed based on a channel access type.

Clause 56. The method of clause 53, wherein the sidelink transmission is determined to be transmitted in response to the sidelink resource being non-overlapping with the COT, and success of listen before talk performed based on a first channel access type.

Clause 57. The method of clause 53, further comprising: determining to transmit an uplink transmission to the base station in response to: at least a portion of the uplink transmission overlapping with the COT; and success of listen before talk performed based on a first channel access type; and determining to transmit the sidelink transmission in response to: the portion of the sidelink transmission overlapping with the COT; and success of listen before talk performed based on a second channel access type, wherein the first channel access type is different than the second channel access type.

Clause 58. The method of clause 57, further comprising transmitting the uplink transmission.

Clause 59. A method for wireless communication, comprising: receiving, by a wireless device, one or more configuration parameters indicating a sidelink bandwidth part (BWP) in an unlicensed spectrum; receiving a downlink control information (DCI), from a base station, indicating a channel occupancy time (COT) duration for a carrier overlapping with the unlicensed spectrum; in response to the DCI, determining: a first channel access type for an uplink transmission to the base station based on a first time of the uplink transmission overlapping with the COT; and a second channel access type for a sidelink transmission, wherein a second time of the sidelink transmission overlaps with the COT, and wherein the second channel access type is different from the first channel access type; transmitting the uplink transmission based on the first channel access type; and transmitting, via the sidelink BWP, the sidelink transmission based on the second channel access type.

Clause 60. The method of clause 59, wherein the one or more configuration parameters further indicate a serving cell in the unlicensed spectrum.

Clause 61. The method of clause 60, wherein a frequency associated with the sidelink BWP is the same as a frequency of the sidelink BWP.

What is claimed is:

1. A method for wireless communication, comprising:
receiving, by a wireless device, one or more configuration parameters indicating a sidelink bandwidth part (BWP) in an unlicensed spectrum;
receiving downlink control information (DCI), from a base station, indicating a channel occupancy time (COT) duration for a carrier overlapping with the unlicensed spectrum;
determining to transmit an uplink transmission to the base station in response to:
  at least a portion of the uplink transmission overlapping with the COT duration; and
  a success of listen before talk performed based on a first channel access type;
determining whether to transmit or drop a sidelink transmission based on at least a portion of a sidelink resource for the sidelink transmission overlapping with the COT duration;
determining to transmit the sidelink transmission in response to:
  the portion of the sidelink transmission overlapping with the COT duration; and a success of listen before talk performed based on a second channel access type, wherein the first channel access type is different than the second channel access type; and transmitting the sidelink transmission via the sidelink BWP in response to determining to transmit.

2. The method of claim 1, wherein the sidelink transmission is determined to be dropped in response to the portion of the sidelink resource overlapping with the COT duration.

3. The method of claim 1, wherein the sidelink transmission is determined to be dropped in response to the portion of the sidelink resource overlapping with the COT duration and failure of listen before talk performed based on the first or second channel access type.

4. The method of claim 1, wherein the sidelink transmission is determined to be transmitted in response to the sidelink resource being non-overlapping with the COT duration, and success of listen before talk performed based on the first channel access type.

5. The method of claim 1, further comprising transmitting the uplink transmission.

6. A method for wireless communication, comprising:
receiving, by a wireless device, one or more configuration parameters indicating a sidelink bandwidth part (BWP) in an unlicensed spectrum;
receiving downlink control information (DCI), from a base station, indicating a channel occupancy time (COT) duration for a carrier overlapping with the unlicensed spectrum;
determining to transmit an uplink transmission to the base station in response to:
at least a portion of the uplink transmission overlapping with the COT duration; and
a success of listen before talk performed based on a first channel access type;
determining to transmit a sidelink transmission in response to:
the portion of the sidelink transmission overlapping with the COT duration; and
success of listen before talk performed based on a second channel access type, wherein the first channel access type is different than the second channel access type; and
transmitting the sidelink transmission via the sidelink BWP in response to determining to transmit.

7. A method for wireless communication, comprising:
receiving, by a wireless device, one or more configuration parameters indicating a sidelink bandwidth part (BWP) in an unlicensed spectrum;
receiving downlink control information (DCI), from a base station, indicating a channel occupancy time (COT) duration for a carrier overlapping with the unlicensed spectrum;
in response to the receiving the DCI, determining a first channel access type for an uplink transmission based on an uplink transmission overlapping with the COT duration and a second channel access type for a sidelink transmission, wherein the first channel access type is different than the second channel access type;
determining whether to transmit or drop the sidelink transmission based on at least a portion of a sidelink resource for the sidelink transmission overlapping with the COT duration;
determining to transmit the uplink transmission to the base station in response to:
at least a portion of the uplink transmission overlapping with the COT duration; and
success of listen before talk performed based on the first channel access type; and
determining to transmit the sidelink transmission in response to:
the portion of the sidelink transmission overlapping with the COT duration; and
a success of listen before talk performed based on the second channel access type.

8. The method of claim 7, wherein the sidelink transmission is determined to be dropped in response to the portion of the sidelink resource overlapping with the COT duration.

9. The method of claim 7, wherein the sidelink transmission is determined to be dropped in response to the portion of the sidelink resource overlapping with the COT duration and failure of listen before talk performed based on the first or second channel access type.

10. The method of claim 7, wherein the sidelink transmission is determined to be transmitted in response to the sidelink resource being non-overlapping with the COT duration, and success of listen before talk performed based on the first channel access type.

11. The method of claim 7, further comprising transmitting the uplink transmission and transmitting the sidelink transmission.

12. One or more tangible non-transitory computer-readable storage media storing computer-executable instructions for performing a computer process on a computing system, the computer process comprising:
receiving, by a wireless device, one or more configuration parameters indicating a sidelink bandwidth part (BWP) in an unlicensed spectrum;
receiving downlink control information (DCI), from a base station, indicating a channel occupancy time (COT) duration for a carrier overlapping with the unlicensed spectrum;
determining whether to transmit or drop a sidelink transmission based on at least a portion of a sidelink resource for the sidelink transmission overlapping with the COT duration;
determining to transmit an uplink transmission to the base station in response to:
at least a portion of the uplink transmission overlapping with the COT duration; and
a success of listen before talk performed based on a first channel access type;
determining to transmit the sidelink transmission in response to:
the portion of the sidelink transmission overlapping with the COT duration; and
success of listen before talk performed based on a second channel access type, wherein the first channel access type is different than the second channel access type; and
transmitting the sidelink transmission via the sidelink BWP in response to determining to transmit.

13. The one or more tangible non-transitory computer-readable storage media of claim 12, wherein the sidelink transmission is determined to be dropped in response to the portion of the sidelink resource overlapping with the COT duration.

14. The one or more tangible non-transitory computer-readable storage media of claim 12, wherein the sidelink transmission is determined to be dropped in response to the portion of the sidelink resource overlapping with the COT duration and failure of listen before talk performed based on the first or second channel access type.

15. The one or more tangible non-transitory computer-readable storage media of claim 12, wherein the sidelink transmission is determined to be transmitted in response to the sidelink resource being non-overlapping with the COT duration, and success of listen before talk performed based on the first channel access type.

16. The one or more tangible non-transitory computer-readable storage media of claim 12, further comprising transmitting the uplink transmission.

17. One or more tangible non-transitory computer-readable storage media storing computer-executable instructions for performing a computer process on a computing system, the computer process comprising:
receiving, by a wireless device, one or more configuration parameters indicating a sidelink bandwidth part (BWP) in an unlicensed spectrum;
receiving downlink control information (DCI), from a base station, indicating a channel occupancy time (COT) duration for a carrier overlapping with the unlicensed spectrum;
in response to the receiving the DCI, determining a first channel access type for an uplink transmission based on an uplink transmission overlapping with the COT duration and a second channel access type for a sidelink transmission, wherein the first channel access type is different than the second channel access type;
determining to transmit the uplink transmission to the base station in response to:
at least a portion of the uplink transmission overlapping with the COT duration; and
success of listen before talk performed based on the first channel access type; and
determining to transmit the sidelink transmission in response to:
the portion of the sidelink transmission overlapping with the COT duration; and
a success of listen before talk performed based on the second channel access type; and
transmitting the sidelink transmission via the sidelink BWP in response to determining to transmit.

18. The one or more tangible non-transitory computer-readable storage media of claim of claim 17, determining whether to transmit or drop the sidelink transmission based on at least a portion of a sidelink resource for the sidelink transmission overlapping with the COT duration, wherein the sidelink transmission is determined to be dropped in response to the portion of the sidelink resource overlapping with the COT duration.

19. The one or more tangible non-transitory computer-readable storage media of claim of claim 17, determining whether to transmit or drop the sidelink transmission based on at least a portion of a sidelink resource for the sidelink transmission overlapping with the COT duration, wherein the sidelink transmission is determined to be dropped in response to the portion of the sidelink resource overlapping with the COT duration and failure of listen before talk performed based on the first or second channel access type.

20. The one or more tangible non-transitory computer-readable storage media of claim of claim 17, determining whether to transmit or drop the sidelink transmission based on at least a portion of a sidelink resource for the sidelink transmission overlapping with the COT duration, wherein the sidelink transmission is determined to be transmitted in response to the sidelink resource being non-overlapping with the COT duration, and success of listen before talk performed based on the first channel access type.

21. The one or more tangible non-transitory computer-readable storage media of claim 17, further comprising transmitting the uplink transmission.

* * * * *